US008762485B2

(12) United States Patent
Ogawa et al.

(10) Patent No.: US 8,762,485 B2
(45) Date of Patent: Jun. 24, 2014

(54) INFORMATION SYSTEM HAVING COMPUTER AND STORAGE APPARATUS COUPLED TO NETWORK

(75) Inventors: Yukio Ogawa, Tokyo (JP); Toshihiko Murakami, Fujisawa (JP); Masayuki Sakata, Matsudo (JP)

(73) Assignee: Hitachi, Ltd., Tokyo (JP)

( * ) Notice: Subject to any disclaimer, the term of this patent is extended or adjusted under 35 U.S.C. 154(b) by 666 days.

(21) Appl. No.: 13/054,305

(22) PCT Filed: Dec. 22, 2010

(86) PCT No.: PCT/JP2010/007452
§ 371 (c)(1),
(2), (4) Date: Jan. 14, 2011

(87) PCT Pub. No.: WO2012/085974
PCT Pub. Date: Jun. 28, 2012

(65) Prior Publication Data
US 2012/0166575 A1 Jun. 28, 2012

(51) Int. Cl.
*G06F 15/16* (2006.01)
(52) U.S. Cl.
USPC .......................... 709/217; 709/232; 709/238
(58) Field of Classification Search
None
See application file for complete search history.

(56) References Cited

U.S. PATENT DOCUMENTS

| 2003/0142628 | A1* | 7/2003 | Alonso et al. | 370/241 |
|---|---|---|---|---|
| 2005/0036499 | A1 | 2/2005 | Dutt et al. | |
| 2009/0292813 | A1 | 11/2009 | Snively et al. | |
| 2010/0226281 | A1* | 9/2010 | Ghosh et al. | 370/254 |
| 2011/0090816 | A1* | 4/2011 | Dutt et al. | 370/254 |
| 2013/0159651 | A1* | 6/2013 | Eguchi et al. | 711/162 |

OTHER PUBLICATIONS

Fibre Channel, Backbone—5 (FC-BB-5), Rev. 2.00, INCITS working draft proposed American National Standard for Information Techology, Jun. 4, 2009, 180 pages.
PCT International Search Report and Written Opinion on application No. PCT/JP2010/007452 Dated May 17, 2011; 9 pages.

* cited by examiner

*Primary Examiner* — Djenane Bayard
(74) *Attorney, Agent, or Firm* — Foley & Lardner LLP

(57) ABSTRACT

The present invention is an information system that includes: a first computer; a first storage apparatus; a first network apparatus, to which the first computer and the first storage apparatus are connected, providing a first fabric service; a second computer; a second storage apparatus; a second network apparatus, to which the second computer and the second storage apparatus are connected, providing a second fabric service; and a network that connects the first network apparatus and the second network apparatus, wherein the first computer accesses the first fabric service, the second computer accesses the second fabric service, and the first storage apparatus and the second storage apparatus access the first fabric service and the second fabric service, respectively.

8 Claims, 25 Drawing Sheets

| LV's VHBA WWPN | LV ID | VM's VHBA WWPN | VM ID |
| --- | --- | --- | --- |
| 407(a)-WWPN | 402(a) | 305(a)-WWPN | 304(a) |
| 407(b)-WWPN | 402(a) | 305(b)-WWPN | 304(a) |
| 407(c)-WWPN | 402(b) | 305(c)-WWPN | 304(b) |
| 407(d)-WWPN | 402(b) | 305(d)-WWPN | 304(b) |
| 407(e)-WWPN | 402(c) | 305(k)-WWPN | 304(f) |
| 407(f)-WWPN | 402(c) | 305(l)-WWPN | 304(f) |
| 407(g)-WWPN | 402(d) | 305(g)-WWPN | 304(d) |
| 407(h)-WWPN | 402(d) | 305(h)-WWPN | 304(d) |
| 407(i)-WWPN | 402(e) | 305(i)-WWPN | 304(e) |
| 407(j)-WWPN | 402(e) | 305(j)-WWPN | 304(e) |
| 407(k)-WWPN | 402(f) | 305(e)-WWPN | 304(c) |
| 407(l)-WWPN | 402(f) | 305(f)-WWPN | 304(c) |
| 407(m)-WWPN | 402(g) | 305(g)-WWPN | 304(d) |
| 407(n)-WWPN | 402(g) | 305(h)-WWPN | 304(d) |
| : | : | : | : |

| FS ID ~901 | VLAN ID ~902 | Edge apparatus ID ~903 |
|---|---|---|
| 207(a) | 110(a) | 101(a) |
| 207(b) | 110(b) | 101(b) |
| 207(c) | 110(c) | 101(c) |
| 207(d) | 110(d) | 101(d) |
| : | : | : |

| I/F WWPN ~801(d) | I/F MAC Address ~1001(d) | Computer ID ~1002 | VLAN ID ~902 |
|---|---|---|---|
| 303(a)-WWPN | 303(a)-MAC | 104(a) | 110(a) |
| 303(b)-WWPN | 303(b)-MAC | 104(a) | 110(b) |
| 303(c)-WWPN | 303(c)-MAC | 104(b) | 110(a) |
| 303(d)-WWPN | 303(d)-MAC | 104(b) | 110(b) |
| 303(e)-WWPN | 303(e)-MAC | 104(c) | 110(c) |
| 303(f)-WWPN | 303(f)-MAC | 104(c) | 110(d) |
| 303(g)-WWPN | 303(g)-MAC | 104(d) | 110(c) |
| 303(h)-WWPN | 303(h)-MAC | 104(d) | 110(d) |
| : | : | : | : |

| I/F WWPN | I/F MAC Address | Storage apparatus ID | VLAN ID |
|---|---|---|---|
| 406(a)-WWPN | 406(a)-MAC | 105(a) | 110(a) |
| 406(b)-WWPN | 406(b)-MAC | 105(a) | 110(b) |
| 406(c)-WWPN | 406(c)-MAC | 105(a) | 110(c) |
| 406(d)-WWPN | 406(d)-MAC | 105(a) | 110(d) |
| 406(e)-WWPN | 406(e)-MAC | 105(b) | 110(a) |
| 406(f)-WWPN | 406(f)-MAC | 105(b) | 110(b) |
| 406(g)-WWPN | 406(g)-MAC | 105(b) | 110(c) |
| 406(h)-WWPN | 406(h)-MAC | 105(b) | 110(d) |
| : | : | : | : |

Column labels: 801(c), 1001(c), 1004, 902. Braces: 1005, 1007.

| VM's VHBA WWPN (801(b)) | VM ID (803) | I/F WWPN (801(d)) | Computer ID (1002) |
|---|---|---|---|
| 305(a)-WWPN | 304(a) | 303(a)-WWPN | 104(a) |
| 305(b)-WWPN | 304(a) | 303(b)-WWPN | 104(a) |
| 305(c)-WWPN | 304(b) | 303(a)-WWPN | 104(a) |
| 305(d)-WWPN | 304(b) | 303(b)-WWPN | 104(a) |
| 305(e)-WWPN | 304(c) | 303(c)-WWPN | 104(b) |
| 305(f)-WWPN | 304(c) | 303(d)-WWPN | 104(b) |
| 305(g)-WWPN | 304(d) | 303(e)-WWPN | 104(c) |
| 305(h)-WWPN | 304(d) | 303(f)-WWPN | 104(c) |
| 305(i)-WWPN | 304(e) | 303(e)-WWPN | 104(c) |
| 305(j)-WWPN | 304(e) | 303(f)-WWPN | 104(c) |
| 305(k)-WWPN | 304(f) | 303(g)-WWPN | 104(d) |
| 305(l)-WWPN | 304(f) | 303(h)-WWPN | 104(d) |
| : | : | : | : |
| 305(a')-WWPN | 304(a') | 303(g)-WWPN | 104(d) |
| 305(b')-WWPN | 304(a') | 303(h)-WWPN | 104(d) |
| : | : | : | : |

| LV's VHBA WWPN | LV ID | I/F WWPN | Storage apparatus ID |
|---|---|---|---|
| 407(a)-WWPN | 402(a) | 406(a)-WWPN | 105(a) |
| 407(b)-WWPN | 402(a) | 406(b)-WWPN | 105(a) |
| 407(c)-WWPN | 402(b) | 406(a)-WWPN | 105(a) |
| 407(d)-WWPN | 402(b) | 406(b)-WWPN | 105(a) |
| 407(e)-WWPN | 402(c) | 406(c)-WWPN | 105(a) |
| 407(f)-WWPN | 402(c) | 406(d)-WWPN | 105(a) |
| 407(g)-WWPN | 402(d) | 406(g)-WWPN | 105(b) |
| 407(h)-WWPN | 402(d) | 406(h)-WWPN | 105(b) |
| 407(i)-WWPN | 402(e) | 406(g)-WWPN | 105(b) |
| 407(j)-WWPN | 402(e) | 406(h)-WWPN | 105(b) |
| 407(k)-WWPN | 402(f) | 406(e)-WWPN | 105(b) |
| 407(l)-WWPN | 402(f) | 406(f)-WWPN | 105(b) |
| 407(m)-WWPN | 402(g) | 406(c)-WWPN | 105(a) |
| 407(n)-WWPN | 402(g) | 406(d)-WWPN | 105(a) |
| : | : | : | : |
| 407(a)-WWPN | 402(a) | 406(c)-WWPN | 105(a) |
| 407(b)-WWPN | 402(a) | 406(d)-WWPN | 105(a) |
| : | : | : | : |
| 407(a')-WWPN | 402(a') | 406(g)-WWPN | 105(b) |
| 407(b')-WWPN | 402(a') | 406(h)-WWPN | 105(b) |
| : | : | : | : |

Fig.11B

| MAC address | Protocol | VLAN ID |
|---|---|---|
| 303(a)-MAC | * | 110(a) |
| 303(b)-MAC | * | 110(b) |
| 303(c)-MAC | * | 110(a) |
| 303(d)-MAC | * | 110(b) |
| 303(e)-MAC | * | 110(c) |
| 303(f)-MAC | * | 110(d) |
| 303(g)-MAC | * | 110(c) |
| 303(h)-MAC | * | 110(d) |
| ⋮ | ⋮ | ⋮ |
| 406(a)-MAC | * | 110(a) |
| 406(b)-MAC | * | 110(b) |
| 406(c)-MAC | * | 110(c) |
| 406(d)-MAC | * | 110(d) |
| 406(e)-MAC | * | 110(a) |
| 406(f)-MAC | * | 110(b) |
| 406(g)-MAC | * | 110(c) |
| 406(h)-MAC | * | 110(d) |
| ⋮ | ⋮ | ⋮ |
| 406(e)-FPMA | * | 110(a) |
| 407(k)-FPMA | * | 110(a) |
| ⋮ | ⋮ | ⋮ |
| 303(a)-MAC | FTP | 110(e) |
| 303(h)-MAC | FTP | 110(e) |
| ⋮ | ⋮ | ⋮ |

Fig.13

INFORMATION SYSTEM HAVING COMPUTER AND STORAGE APPARATUS COUPLED TO NETWORK

TECHNICAL FIELD

This invention relates to an information process system that has a computer and storage apparatus coupled to a network device, as well as a construction/operation method of the information process system. Particularly, the present invention relates to a communication path management method for managing a network path between the computer and the storage apparatus.

BACKGROUND ART

As a computer system for a data center consolidates more and more, a network system serving as the base of the computer system becomes more complicated. For this reason, technology for simplifying the network system and its management is required. There is a Fibre Channel over Ethernet (FCoE) as the simplification technology. FCoE is a standard for encapsulating a Fibre Channel (FC) frame within an Ethernet frame and operating it on the Ethernet. This technology enables both a network system (a communication system using the FC) coupling a computer to a storage apparatus and a network system (a communication system using the Ethernet and an IP (Internet Protocol)) coupling a computer to a terminal apparatus or a computer to a computer to be constructed from physically the same network apparatus. A reduction in the number of network interface cards (network adapters)/host bus adapters for the computers and storage apparatuses, and a reduction in the number of network cables and network apparatuses can be expected as the effects of the use of this technology.

As a management technology in FCoE, there is disclosed technology for allocating MAC (Media Access Control) addresses to computers or storage apparatuses that transmit the FCoE frame (see Patent Literature 1, for example).

The FCoE standard is becoming standardized according to the standards group ANSI (American National Standards Institute) and INCITS (International Committee for Information Technology Standards) T11, wherein function models and so on are specified (see Non Patent Literature 1, for example).

CITATION LIST

Patent Literature

PTL 1: United States Patent Application Publication No. 2009/0292813

Non Patent Literature

NPL 1: ANSI INCITS, "Fibre Channel Backbone-5 (FC-BB-5)" [online] Internet URL: http://www.t11.org/ftp/t11/pub/fc/bb-5/09-056v5.pdf, 2009

SUMMARY OF INVENTION

Technical Problem

The technology described in the abovementioned literature takes into consideration managing computers and storage apparatuses, such as allocating MAC addresses to these individual apparatuses, but does not take into consideration how the communication paths should be managed in the entire network system where many computers/storage apparatuses are disposed in a large-scale data center. In a network using FCoE, a fabric service function is responsible for allocating the MAC addresses and for transferring an FC frame encapsulated within an FCoE frame. The performance of an apparatus having the fabric service function is not infinite. If the number of computers/storage apparatuses exceeds a certain number, a plurality of the fabric service functions need to be disposed on the network system. The communication paths between the computers and the storage apparatuses need to be managed after the arrangement of the fabric service functions is defined.

Solution to Problem

The present invention was contrived in view of the aforementioned problems in a large-scale data center in which many computers and storage apparatuses are disposed. An object of the present invention is to provide a network system in which a plurality of network apparatuses with fabric service functions are disposed, the network system being a management apparatus capable of managing and configuring communication paths between the computers and the storage apparatuses.

Another object of the present invention is to provide a management apparatus that is capable of managing and configuring changes in the communication paths between the computers and the storage apparatuses, without changing the configurations of virtual computers operated on the computers and logical volumes operated on the storage apparatuses, even when the computers and storage apparatuses are renewed.

In order to achieve the objects described above, an information system according to one aspect of the present invention is an information system, which includes: a first computer; a first storage apparatus; a first network apparatus coupled to the first computer and the first storage apparatus and providing a first fabric service; a second computer; a second storage apparatus; a second network apparatus coupled to the second computer and the second storage apparatus and providing a second fabric service; and a network that couples the first network apparatus and the second network apparatus, wherein the first computer accesses the first fabric service, the second computer accesses the second fabric service, and the first storage apparatus and the second storage apparatus access both the first fabric service and the second fabric service, respectively.

In order to achieve the objects described above, a management method according to one aspect of the present invention is a management method that is performed by a management computer coupled to an information system that includes: a first computer; a first storage apparatus; a first network apparatus coupled to the first computer and the first storage apparatus and providing a first fabric service; a second computer; a second storage apparatus; a second network apparatus coupled to the second computer and the second storage apparatus and providing a second fabric service; and a network that couples both the first network apparatus and the second network apparatus, wherein the management computer: configures fabric service allocation information for associating the first fabric service with a first virtual network and associating the second fabric service with a second virtual network; configures computer allocation information for associating the first virtual network with the first computer, associating the second virtual network with the second computer, and associating the first virtual network and the second virtual network with the first storage apparatus; configures storage apparatus allocation information for associating the first virtual network and the second virtual network with the first storage apparatus and associating the first virtual network and the second virtual network with the second storage apparatus; and configures the first virtual network in the first network apparatus and the second virtual network in the first network apparatus such that the first computer accesses the first fabric service, the second computer accesses the second fabric service, and that the first storage apparatus and the second storage apparatus access the first fabric service and the second fabric service, respectively.

Advantageous Effects of Invention

According to the present invention, even in a large-scale network in which a plurality of computers and a plurality of storage apparatuses are coupled to a plurality of network apparatuses, is it possible to completely establish communication paths between the computers and the storage apparatuses. Moreover, the communication paths between the computers and the storage apparatuses can be managed and configured efficiently.

BRIEF DESCRIPTION OF DRAWINGS

FIG. 8 is an explanatory diagram of a logical volume allocation table.
FIG. 9 is an explanatory diagram of a fabric service allocation table.
FIG. 10A is an explanatory diagram of a communication interface allocation table.
FIG. 10B is an explanatory diagram of a communication interface allocation table.
FIG. 11A is an explanatory diagram of a virtual HBA allocation table.
FIG. 11B is an explanatory diagram of a virtual HBA allocation table.
FIG. 13 is an explanatory diagram of a VLAN allocation table.

DESCRIPTION OF EMBODIMENTS

Figure 1:
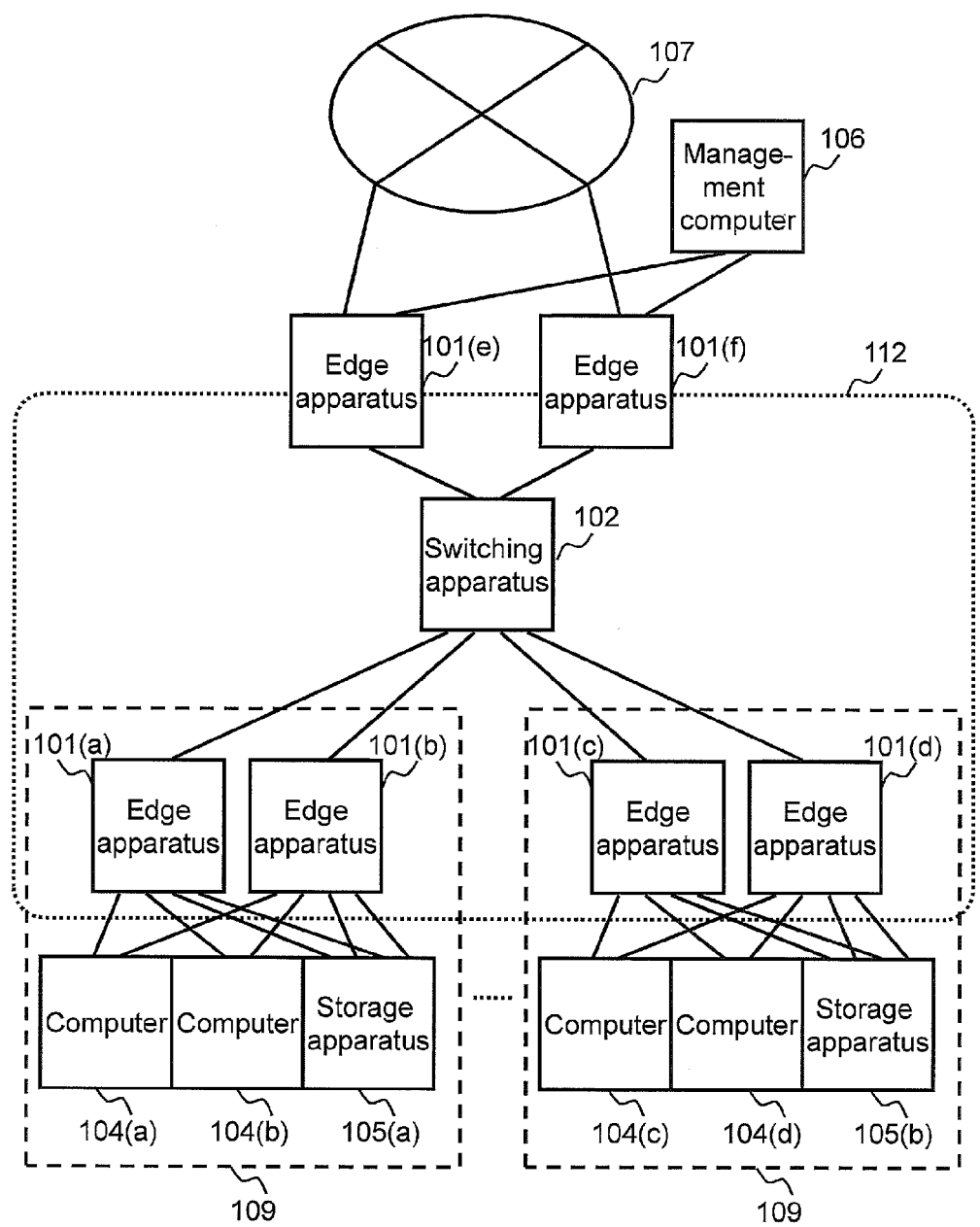
FIG. 1 shows a composition example of a computer system according to an embodiment of the present invention.

An embodiment of the present invention is described hereinafter with reference to the diagrams.

Note in the following description that a variety of information are illustrated in the form of "kkk tables." The variety of information may be expressed using data structures other than the tables. In order to explain that the information do not depend on the data structures, "kkk tables" can also be referred to as "kkk information."

In addition, in the following description, various target identification information are represented by numbers or identifiers, but various identification information that are not represented by numbers or identifiers may be employed as well.

Moreover, in the following description, the term "program" is used as the subject in a sentence describing each process. However, because the program carries out a certain process by appropriately using a storage resource (a memory, for example) and/or a communication interface device (a communication port, for example) by being executed by a processor (a CPU (Central Processing Unit), for example), the subject of the process may be "processor." A process described by the term "program" as the subject may be carried out by a network apparatus or a management computer. The processor also may include a hardware circuit for carrying out part or all of the processes performed by the processor. A computer program may be installed from a program source into each computer. The program source may be, for example, a program distribution server or a storage medium.

Furthermore, in the following description, a management apparatus of a computer system may be composed of one or more computers. More specifically, for example, when a management computer displays information or when the management computer transmits the displayed information to a remote computer, the management computer serves as the management apparatus. Also, for example, when functions equivalent to those of the management computer are realized by a plurality of computers, the plurality of computers (may include a display computer when the display computer performs the display) serve as the management apparatus. In this embodiment, the management computer serves as the management apparatus.

In the following description, the same reference numerals shown in each diagram represent the same elements (or corresponding elements). For convenience of description, the elements of the same type are discriminated from one another, by adding characters and numbers such as (a), (b), (c), (1), (2), (3) and the like to the reference numerals.

In the description hereinbelow, the following abbreviations are used.
(*) A virtual computer is often abbreviated to "VM."
(*) A communication interface is often abbreviated to "I/F."

(*) A logical volume is often abbreviated to "LV."
(*) A fabric service is often abbreviated to "FS."
(*) A virtual HBA is often abbreviated to "VHBA."
<System Composition>

FIG. 1 is a diagram showing a composition example of an information process system according to an embodiment of the present invention.

The information process system includes a computer system and a management computer 106 for managing the computer system.

The computer system includes a plurality of edge apparatuses 101. The edge apparatuses 101 are network apparatuses. An external network 107 is coupled to at least one of the plurality of edge apparatuses 101 (edge apparatuses 101(e) and 101(f), for example). Furthermore, the management computer 106 is coupled to at least one of the plurality of edge apparatuses 101.

The computer system includes the edge apparatuses 101, a switching apparatus 102, computers 104, and storage apparatuses 105. The switching apparatus 102 is a network apparatus. At least one of these elements other than the edge apparatuses 101, for instance, may have the plurality of computers 104 and storage apparatuses 105.

The external network 107 may be a standard communication network that transfers communication packets according to an IP protocol or the like (e.g., the Internet, Intranet, or an integrated communication network thereof). A terminal apparatus (not shown) that communicates with the computers 104 is coupled to the external network 107. The terminal apparatus may be any type of apparatus as long as it has a communication function for transmitting and receiving data to and from the computers 104. Examples of the terminal apparatus include a personal computer and sensor.

Integrated apparatuses 109 may be composed of the computers 104, the storage apparatuses 105 and the edge apparatuses 101. The integrated apparatuses are removable in apparatuses of integrated apparatuses and coupled to the switching apparatus 102 by using the edge apparatuses 101 as interfaces. In FIG. 1 of the present embodiment, each of the integrated apparatuses 109 includes, but not limited to, two computers 104, one storage apparatus 105, and two edge apparatuses 101.

The edge apparatuses 101 and the switching apparatus 102 are the components of a network (internal network 112) in which the computers 104 are coupled to the storage apparatuses 105. Transmission/reception of a communication frame is carried out between the computers 104, between each computer 104 and each storage apparatus 105, or between the storage apparatuses 105 via the network 112. In the present embodiment the communication between the apparatuses is based on IEEE 802.3 (Ethernet) standard. Therefore, "communication frame" described in the present embodiment is an IEEE 802.3 (Ethernet) based communication frame (or a frame having an Ethernet enhancement function that is becoming standardized by IEEE 802.1 Data Center Bridging Task Group). The communication between each computer 104 and each storage apparatus 105 is based on FCoE (Fibre Channel over Ethernet) according to ANSI T11. Therefore, the communication frame between the computer 104 and the storage apparatus 105 is based on FCoE, or a format in which an FC (Fibre Channel) frame is encapsulated within an Ethernet frame.

The edge apparatuses 101 and the switching apparatus 102 are capable of logically dividing the network 112 into a plurality of areas by using VLANs (Virtual Local Area Network) 110. The VLANs 110 are areas reached by a communication broadcast frame that is logically separated by the edge apparatuses 101 and the switching apparatus 102. The VLANs 110 are realized according to a predetermined standard (IEEE 802.1Q, for example).

The edge apparatuses 101 typically are switch apparatuses. Each edge apparatus 101 is composed so as to be able to insert a tag (IEEE 802.1Q tag, for example) to the communication frame received from each computer 104 or storage apparatus 105. The edge apparatus 101 also can remove the tag from the communication frame that has the tag, and transmit the communication frame without the tag to the computer 104 or storage apparatus 105. The edge apparatus 101 provides the computer 104 and storage apparatus 105 with a communication interface in the network 112.

The switching apparatus 102 is typically a switch apparatus. The switching apparatus 102 receives the communication frame having the tag from the edge apparatus 101, and transfers this communication frame to any of the edge apparatuses 101 in accordance with a destination address recorded in the communication frame. The switching apparatus 102 may be composed substantially the same as the edge apparatuses 101.

The apparatuses of the information process system shown in FIG. 1 are described hereinafter in detail.

Figure 2:
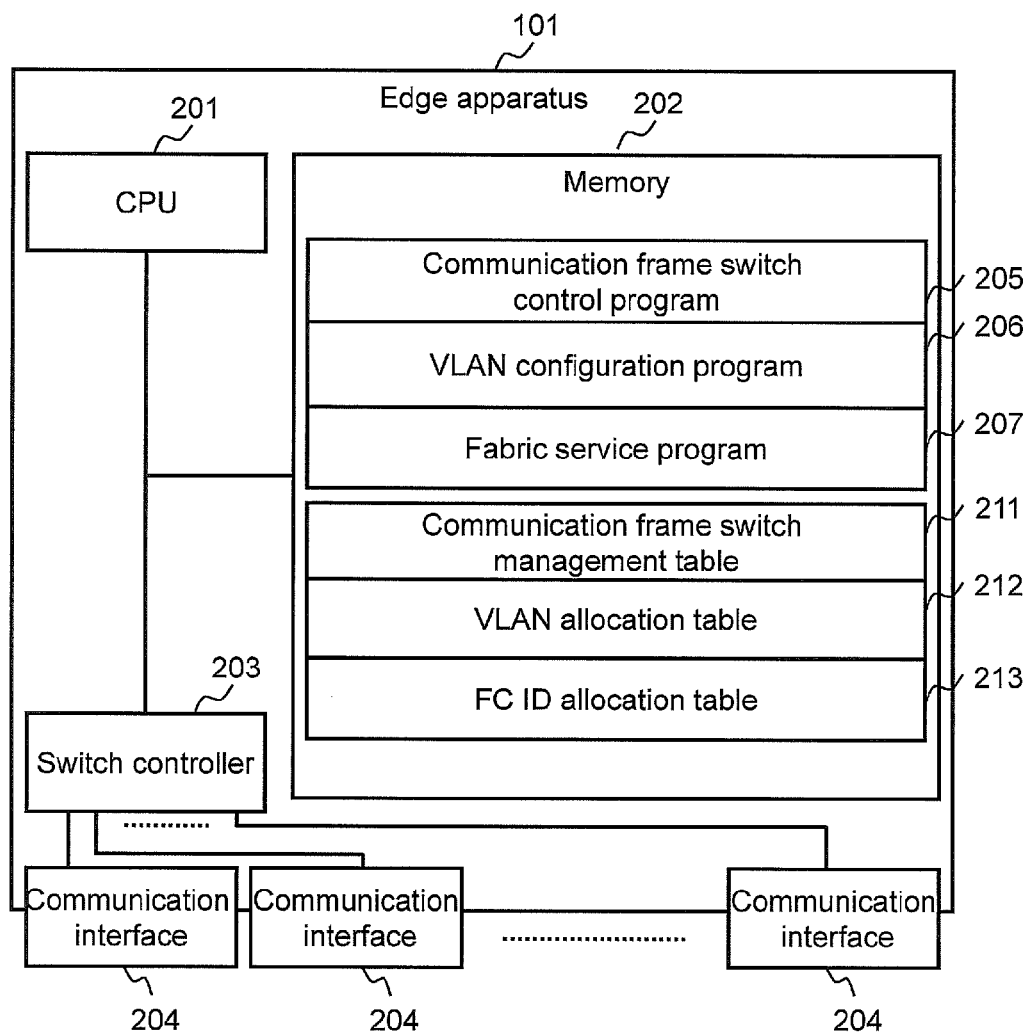
FIG. 2 is a functional composition example of a network apparatus.

FIG. 2 shows a composition example of the edge apparatus 101.

The edge apparatus 101 includes communication interfaces, a storage resource, and a processor coupled to these communication interfaces and the storage resource. Specifically, for example, the edge apparatus 101 includes the following hardware elements. At least there are a plurality of the communication interfaces 204.

(*) A CPU 201: Executes programs.
(*) A memory 202: Stores the programs and data used by the programs.
(*) The communication interfaces 204: Coupled to any of the computers 104, storage apparatuses 105 and switching apparatus 102 by, for example, cables.
(*) A switch controller 203: Transfers the communication frame from any of the computers 104 and the storage apparatuses 105, or from the switching apparatus 102.

As shown in FIG. 2, the memory 120 stores at least the following programs and tables.

(*) A communication frame switch control program 205: Controls switching of the communication frame (Ethernet frame).
(*) A VLAN configuration program 206: Controls the VLANs 110 and configures or updates a VLAN allocation table 212.
(*) A fabric service program 207: Provides fabric services.
(*) A communication frame transfer management table 211: Includes path information used for transferring the Ethernet frame.
(*) A VLAN allocation table 212: Includes information used for identifying the VLAN 110 to which the communication frame belongs.
(*) An FC ID (Fibre Channel IDentifier) allocation table 213: Includes WWPNs (World Wide Port Name) of the apparatuses logged into the fabric services, and FC IDs allocated to the WWPNs.

Note that "WWPN" is an identifier allocated to an FC port in an FC network. In addition, "FC ID" is a unique address used for transferring an FC frame in the FC network.

The fabric services provided by the fabric service program 207 each include at least the following functions.

(*) A fabric server function: A function for allocating MAC (Media Access Control) addresses to the apparatuses logged into the fabric services.

(*) A name server function: A function that allows information on the apparatuses logged into the fabric services to be registered in a database, shared by the apparatuses, and used for discovering the other apparatuses.

Each fabric service provided by the fabric service program 207 is often abbreviated to "fabric service 207" hereinafter. Note that logging into the fabric services means logging into the functions provided by each fabric service. In the present embodiment, receiving or communicating information between the fabric services is not performed. The MAC addresses are unique identifiers that are allocated to Ethernet ports in an Ethernet network.

Figure 3:
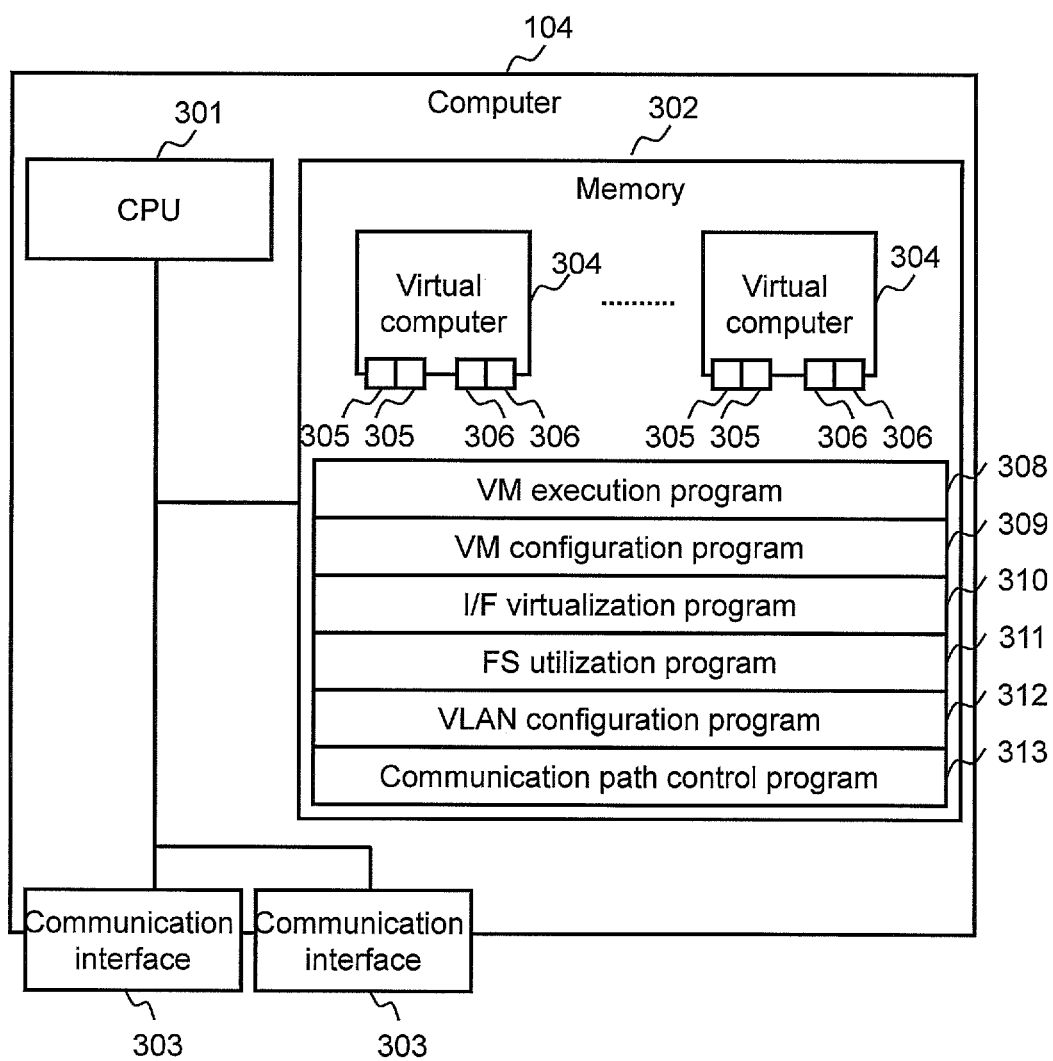
FIG. 3 is a functional composition example of a computer.

FIG. 3 shows a composition example of the computers 104.

The computer 104 is an apparatus that executes programs used by the other computers 104 and the terminal apparatus. The computer 104 has communication interfaces, a storage resource, and a processor coupled to these communication interfaces and the storage resource. Specifically, for example, the computer 104 includes the following hardware elements.

(*) A CPU 301: Executes the programs.
(*) A memory 302: Stores the programs and data used by the programs.
(*) Communication interfaces 303: Communicate with the other computers 104 or the storage apparatuses 105.

The communication interfaces 303 are, for example, Ethernet controllers. Each of the communication interfaces 303 may be a converged network adapter (CNA) in which an adapter for communicating with the computers 104 and the adapter for communicating with the storage apparatuses 105 are converged.

The memory 302 stores, for example, the following programs.

(*) A virtual computer execution control program 308: Controls the execution of virtual computers 304.
(*) A virtual computer configuration program 309: Configures the virtual computers 304.
(*) A communication interface virtualization program 310: Defines a plurality of WWPNs 801 for one communication interface 303.
(*) A fabric service utilization program 311: Accesses the functions that are provided by each fabric service 207 provided by the edge apparatus 101.
(*) A VLAN configuration program 312: Requests configuration or update of the VLAN allocation table 212.
(*) A communication path control program 313: Controls a duplicated communication path.

The virtual computers 304 are virtual computers that can have the functions equivalent to those of an actual computer. Each of the virtual computers 304 includes, for example, the following virtual communication interfaces.

(*) A virtual HBA (Host Bus Adapter) 305: A virtual communication interface for communicating with the storage apparatus 105 related to the virtual computer 304, wherein the WWPN is defined.
(*) A virtual NIC (Network Interface Card) 306: A virtual communication interface for communicating with the computer 104 related to the virtual computer 304.

A usage rate of a CPU configured by the virtual computer configuration program 309 may be allocated to the virtual computers 304. Note that the virtual computers 304 described on the memory 302 logically describe virtual computers that are executed by the virtual computer execution control program 308.

Figure 4:
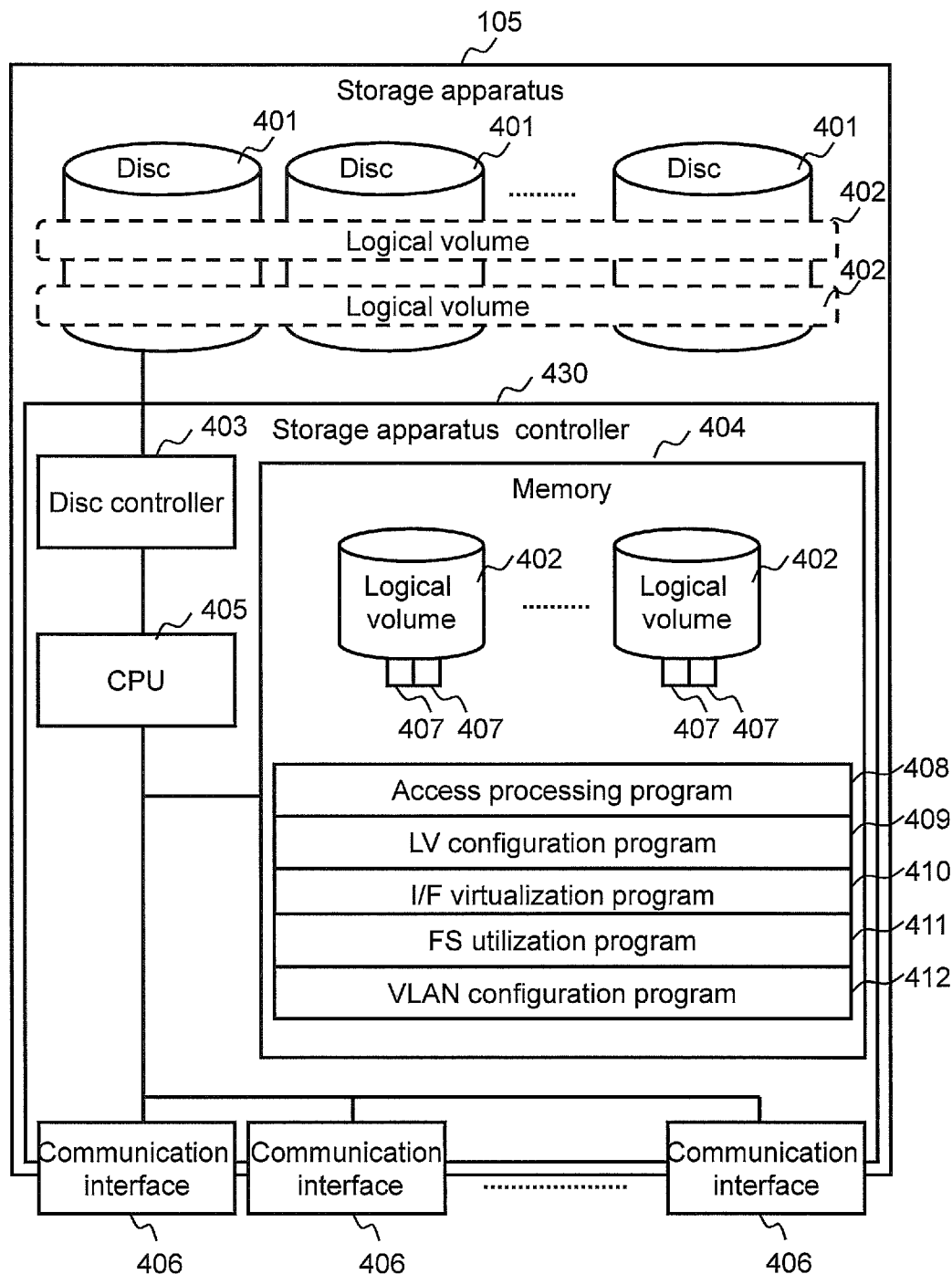
FIG. 4 is a functional composition example of a storage apparatus.

FIG. 4 shows a composition example of one of the storage apparatuses 105.

The storage apparatus 105 is an apparatus for storing programs and data that are used by the computers 104 or the other storage apparatuses 105. The storage apparatus 105 may be a single disk or a so-called disk array apparatus with a plurality of disks. The storage apparatus 105 includes, for example, the following hardware elements.

(*) Disks 401: Devices for storing the programs and data, and examples thereof include hard disk drives (HDD) and solid state drives (SSD).
(*) A storage apparatus controller 430: Controls I/O processes (reading and writing of the programs and data) performed on the plurality of disks 401, in response to an input/output request for requesting input/output of the programs and data, which is issued from the computer 104.

In place of the disks 401, other types of physical storage devices may be employed. One or more logical volumes 402 are configured in one or more of the disks 401 (for example, a RAID (Redundant Array of Independent (or Inexpensive) Disks) group). The programs or data (e.g., an operating system, application program, or data used by these programs) are stored in the disks 401 corresponding to the logical volumes 402. For example, as the virtual communication interface, a virtual HBA 407 is related to each logical volume 402. The WWPN is defined in the virtual HBA 407. Note that the logical volumes 402 described on a memory 404 logically describe logical volumes that are provided by a logical volume control program 409, which is described hereinafter, and that actual data are stored in the disks.

The storage apparatus controller 430 includes communication interfaces, a storage resource, and a processor coupled to these communication interfaces and the storage resource. The storage apparatus controller 430 includes, for example, the following hardware elements.

(*) A disk controller 403: Controls the disks 401.
(*) The memory 404: Stores the programs and data used by the programs.
(*) A CPU 405: Executes the programs.
(*) Communication interfaces 406: Ethernet controllers that communicate with the edge apparatuses 101. Transmit/receive the Ethernet frame during the communication.

The memory 404 stores, for example, the following programs.

(*) An access process program 408: Executes a read/write request requesting reading/writing of the data from/to the logical volumes 402, the request being issued from the computer 104.
(*) The logical volume control program 409: Configures the logical volumes 402.
(*) A communication interface virtualization program 410: Defines the plurality of WWPNs 801 for one communication interface 406.
(*) A fabric service utilization program 411: Accesses the functions that are provided by the fabric services 207 provided by the edge apparatus 101.
(*) A VLAN configuration program 412: Requests configuration or update of the VLAN allocation table 212.

Figure 5:
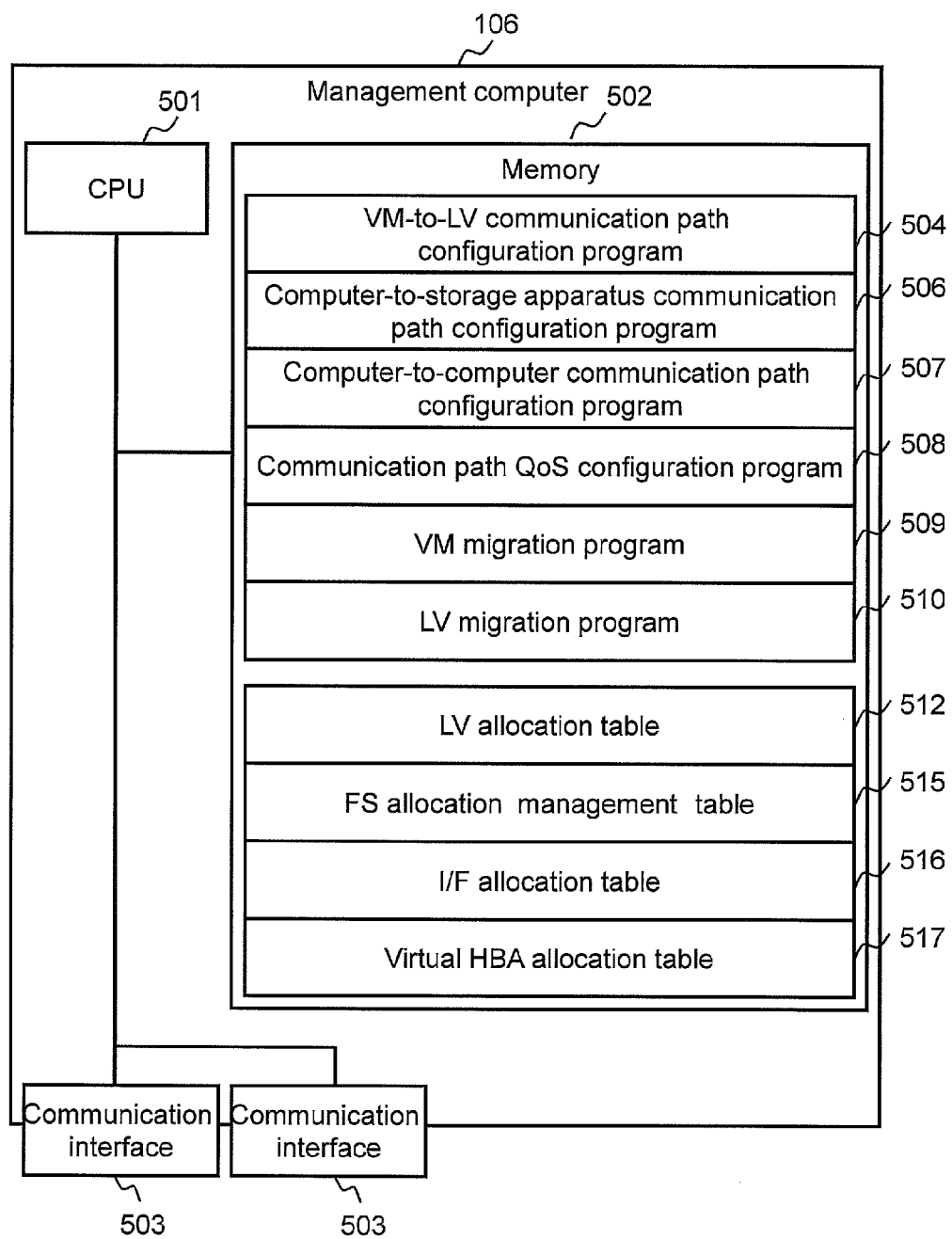
FIG. 5 is a functional composition example of a management computer.

FIG. 5 shows a composition example of the management computer 106.

The management computer 106 is a computer that manages the edge apparatus 101, switching apparatus 102, computer 104 and storage apparatus 105. The management computer 106 includes communication interfaces, a storage source, and a processor coupled to these communication interfaces and the storage resource. The management computer 106 includes, for example, the following hardware elements.

(*) A CPU 501: Executes programs.
(*) A memory 502: Stores the programs and data used by the programs.

(*) Communication interfaces 503: Interfaces, or, for example, Ethernet controllers, that are coupled to the edge apparatuses 101.

The memory 502 stores, for example, the following programs and tables.

(*) A virtual computer-to-logical volume communication path configuration program 504: Configures the communication path between each virtual computer 304 and each logical volume 402.

(*) A computer-to-storage apparatus communication path configuration program 506: Configures the communication path between the computer 104 and the storage apparatus 105.

(*) A computer-to-computer communication path configuration program 507: Configures the communication path between the computers 104.

(*) A communication path QoS configuration program 508: Configures a QoS (Quality of Service) of each communication paths (configures priority control and bandwidth control).

(*) A virtual computer migration program 509: Migrates each virtual computer 304 between the computers 104.

(*) A logical volume migration program 510: Migrates each logical volume 402 between the storage apparatuses 105.

(*) A logical volume allocation table 512: Includes information showing the allocation of each logical volumes 402 of the storage apparatus 105 to each virtual computers 304 of the computer 104.

(*) A fabric service allocation table 515: Includes information showing the allocations of the fabric services 207 to the edge apparatuses 101 and the allocations of the VLANs 110 to the fabric services 207.

(*) A communication interface allocation table 516: Includes information showing the allocation of the communication interface 303 of the computer 104 to each VLAN 110 and the allocation of the communication interface 406 of the storage apparatus 105 to each VLAN 110.

(*) A virtual HBA allocation table 517: Includes the information showing the allocation of the virtual HBA 305 to the communication interface 303 within the computer 104 and the allocation of the virtual HBA 407 to the communication interface 406 of the storage apparatus 105.

A variety of processes that are performed in the present embodiment are described below. Note that the following description is provided appropriately with reference to FIG. 7A (a diagram showing an example of a composition between each of the computers 104 and each of the edge apparatuses 101) and FIG. 7B (a diagram showing an example of a composition between each of the storage apparatuses 105 and each of the edge apparatuses 101).

<Communication Path Configuration Process>

Figure 6:
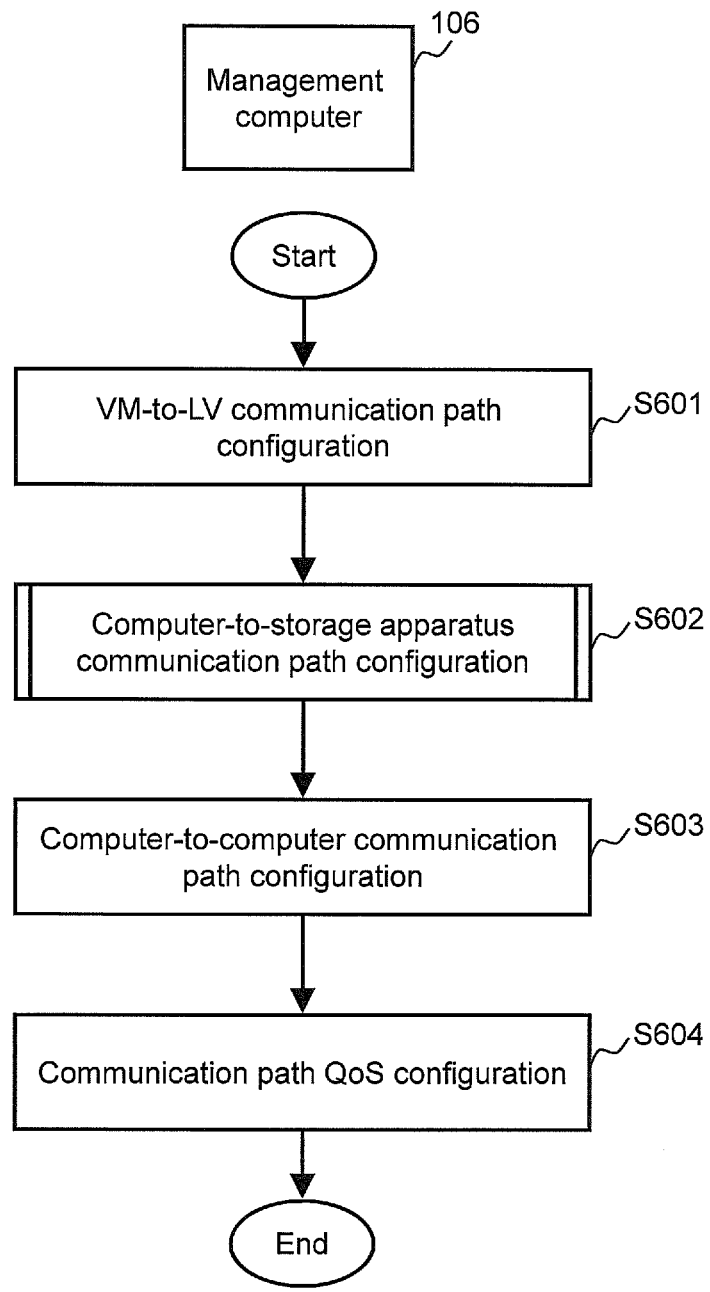
FIG. 6 is a flowchart showing a communication path configuration process.

FIG. 6 is a flowchart showing an example of a process flow of a communication path configuration process. The management computer 106 implements the communication path configuration process. The communication path configuration process is implemented when, for example, adding more of the computers 104, storage apparatuses 105 or integrated apparatuses 109 in order to reconstruct the entire information process system.

<<Configuration of Communication Path Between Virtual Computer and Logical Volume>>

In S601, the management computer 106 (the virtual computer-to-logical volume communication path configuration program 504) configures the communication path between each virtual computer 304 and each logical volume 402.

First, the management computer 106 configures the allocation of the logical volume 402 to the virtual computer 304. Note that the present embodiment establishes, but not limited to, a dual fabric composition (duplicated path composition) between the virtual computer 304 and the logical volume 402. The management computer 106 configures a plurality of virtual HBAs for the logical volume 402 and the virtual computer 304, and relate the virtual HBAs 305 of the virtual computer 304 to the virtual HBAs 407 of the logical volume 402.

The management computer 106 uses, for example, the logical volume allocation table 512 illustrated in FIG. 8, to manage the allocation of the logical volume 402 to the virtual computer 304. The logical volume allocation table 512 shows the allocation of a certain virtual HBA 407 of a certain logical volume 402 to a certain virtual HBA 305 of a certain virtual computer 304. In other words, for example, the logical volume allocation table 512 includes the following information with respect to the association between each virtual HBA 305 and each virtual HBA 407, as shown in FIG. 8.

(*) A WWPN 801(*a*): The WWPN of each virtual HBA 407 related to each logical volume 402.

(*) A logical volume ID 802: A unique identifier of each logical volume 402.

(*) A WWPN 801(*b*): The WWPN of each virtual HBA related to each virtual computer 304.

(*) A virtual computer ID 803: A unique identifier of each virtual computer 304.

Figure 7A:
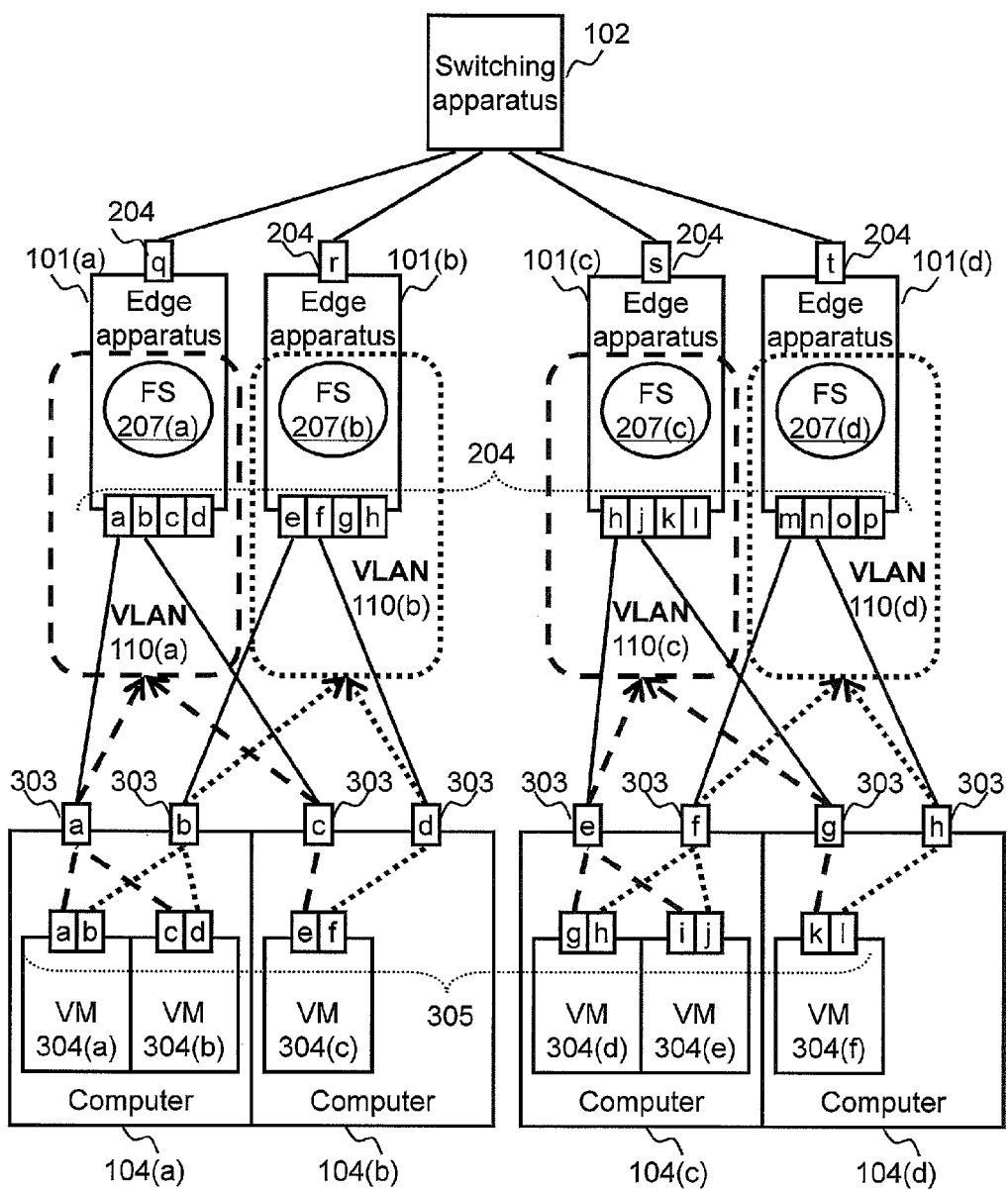
FIG. 7A is an explanatory diagram illustrating an outline of communication path configuration.
Figure 7B:
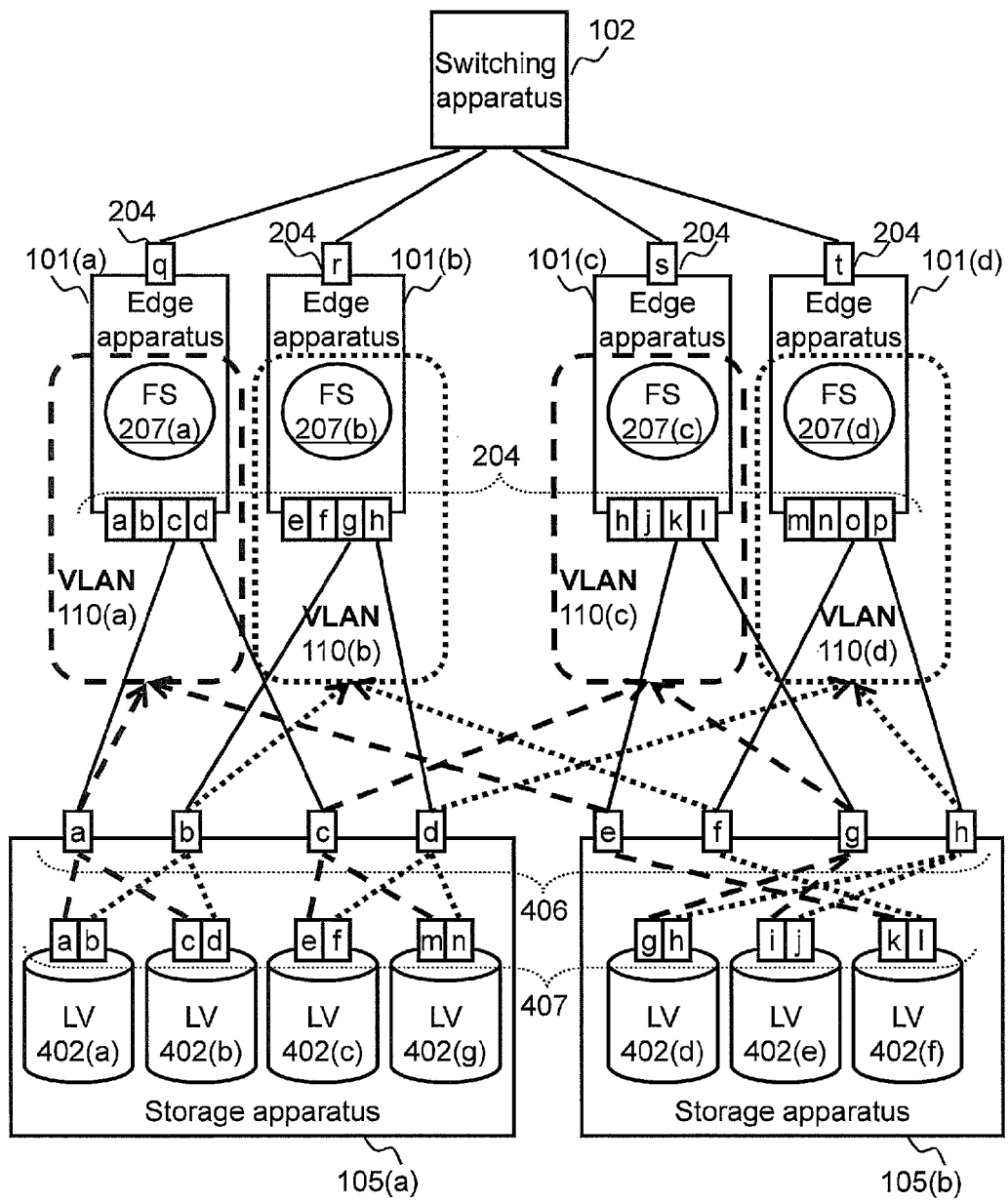
FIG. 7B is an explanatory diagram illustrating an outline of communication path configuration.

This table 512 shows, for example, the allocation of the logical volumes 402 to the virtual computers 304 shown in FIGS. 7A and 7B. A duplicated path is configured as the dual fabric composition between each logical volume 402 and each virtual computer 304.

A manager may define the allocation of the logical volume 402 to the virtual computer 304, which is the allocation of the WWPN 801(*b*) to the WWPN 801(*a*). In the following description, the relation among the WWPN 801(*a*), the logical volume ID 802, the WWPN 801(*b*), and the virtual computer ID 803 is shown in each row 804 in the logical volume allocation table 512.

In the present embodiment, all of the edge apparatuses 101 provide the fabric services 207. Note that one edge apparatus 101 may provide the plurality of fabric services 207. Furthermore, the VLAN is allocated to each of the fabric services 207 provided by the edge apparatuses 101. The management computer 106 uses, for example, the fabric service allocation table 515 shown in FIG. 9, to manage the fabric services 207 provided by the edge apparatuses 101. The management computer 106 also allocates one VLAN 110 to one fabric service 207. When the plurality of fabric services 207 are set, allocating one VLAN 110 to one fabric service 207 can eliminate the link among the fabric services 207, as well as the necessity of a complicated configuration required in the link among the fabric services 207. Management of the VLAN allocated to each fabric service 207 can also be performed by using the fabric service allocation table 515.

The fabric service allocation table 515 shows the allocation of a certain VLAN to the fabric service of a certain edge apparatus. The fabric service allocation table 515 includes, for example, the following information with respect to each fabric service, as shown in FIG. 9.

(*) A fabric service ID 901: A unique identifier of each fabric service 207.

(*) A VLAN ID 902: A unique identifier of the VLAN 110 allocated to the fabric service.

(*) A edge apparatus ID 903: A unique identifier of each of the edge apparatuses 101 providing the fabric services.

In the following description, the VLAN 110 configured with respect to each of the fabric services 207 and the edge apparatuses 101 providing the fabric services 207 are shown in rows 904 in the fabric service allocation table 515.

Next, the management computer 106 uses the communication interface allocation table 516 to manage the allocation of the communication interfaces to the VLANs 110.

The management computer 106 allocates the communication interfaces to the respective VLANs in accordance with the following communication interface allocation rules.

(*) The computer 104 belongs to the VLAN 110 that is allocated to the fabric service provided by the edge apparatus 101 to which this computer 104 (itself) is directly coupled (FIG. 7A).

(*) The storage apparatus 105 belongs to the VLANs 110 that are allocated to the fabric services provided by all of the edge apparatuses 101 within a network 112. The storage apparatus 105 may belong to the VLAN 110 that is allocated not only to the fabric service provided by the edge apparatus 101 to which this storage apparatus 105 (itself) is directly coupled, but also to the fabric services provided by the edge apparatuses 101 to which this storage apparatus 105 (itself) is not directly coupled (but coupled via the other edge apparatuses 101)(FIG. 7B).

When the edge apparatus 101, computer 104, and storage apparatus 105 are provided as the integrated apparatuses 109, the following rules apply.

(*) The computer 104 belongs to the VLAN 110 that is allocated to the fabric service provided by the edge apparatus 101 in the integrated apparatus 109 to which this computer 104 (itself) belongs.

(*) The storage apparatus 105 belongs to the VLANs 110 that are allocated to the fabric services provided by the edge apparatuses 101 within all of the integrated apparatuses 109. The storage apparatus 105 may belong to the VLAN 110 that is allocated not only to the fabric service provided by the edge apparatus 101 within the integrated apparatus 109 to which this storage apparatus 105 (itself) belongs, but also to the fabric service provided by the edge apparatus 101 of another integrated apparatus 109 on the network, to which this storage apparatus 105 (itself) does not belong.

According to the composition described above, the computer 104 can access all of the storage apparatuses 105 by accessing one fabric service provided by the edge apparatus 101 that is coupled to this computer 104 itself.

FIG. 10A shows a composition example of a communication interface allocation table 516(a) of the computer 104.

This table 516(a) shows the allocation of a certain communication interface of the computer to a certain VLAN. In other words, the communication interface allocation table 516(a) includes, for example, the following information with respect to each of the communication interfaces 303 of the computer.

(*) A communication interface WWPN 801(d): The WWPN of the certain communication interface 303 of the computer 104.

(*) A communication interface MAC address 1001(d): The MAC address of the communication interface 303 of the computer 104.

(*) A computer ID 1002: A unique identifier of the computer 104 having the communication interface 303.

(*) The VLAN ID 902: A unique identifier of the VLAN 110 allocated to the communication interface 303.

In accordance with the VLAN allocation rules described above, the management computer 106 allocates each communication interface 303 of the computer 104 to the VLAN 110 that is allocated to the edge apparatus 101 to which this computer 104 (itself) is directly coupled (without using the other edge apparatus). For example, when a communication interface 303(a) of a computer 104(a) is directly coupled to a edge apparatus 101(a), the management computer 106 allocates the communication interface 303(a) of the computer 104(a) to a VLAN 110(a) of a fabric service 207(a) configured in the edge apparatus 101(a).

In this manner, the allocation of each communication interface 303 of the computer 104 to each VLAN 110 is performed as shown in each row 1003 in the communication interface allocation table 516(a).

FIG. 10B shows a composition example of a communication interface allocation table 516(b) of the storage apparatus 105.

This table 516(b) shows the allocation of a certain communication interface 406 of the storage apparatus 105 to a certain VLAN. In other words, the communication interface allocation table 516(b) includes, for example, the following information with respect to each communication interface 406 of the storage apparatus 105.

(*) A communication interface WWPN 801(c): The WWPN of the certain communication interface 406 of the storage apparatus 105.

(*) A communication interface MAC address 1001(c): The MAC address of the communication interface 406 of the storage apparatus 105.

(*) A storage apparatus ID 1004: A unique identifier of the storage apparatus 105 having the communication interface 406.

(*) The VLAN ID 902: A unique identifier of the VLAN 110 allocated to the communication interface 406.

In accordance with the VLAN allocation rules, the management computer 106 allocates each of the communication interfaces 406 of each storage apparatus 105 to not only the VLAN 110 that is allocated to the edge apparatus 101 to which this storage apparatus 105 (itself) is directly coupled, but also the VLAN that is allocated to the edge apparatus 101 to which this storage apparatus 105 (itself) is indirectly coupled via another edge apparatus. For example, the management computer 106 allocates a communication interface 406(a) of a storage apparatus 105(a) to the VLAN 110(a), a communication interface 406(b) to a VLAN 110(b), a communication interface 406(c) to a VLAN 110(c), and a communication interface 406(d) to a VLAN 110(d).

In this manner, the allocation of each communication interface 406 of the storage apparatus 105 to each VLAN 110 is performed as shown in each row 1005 in the communication interface allocation table 516(b).

Next, the management computer 106 uses the virtual HBA allocation table 516 to manage the allocation of the communication interfaces to the communication interfaces.

FIG. 11A shows a composition example of a virtual HBA allocation table 517(a) of the computer 104.

The virtual HBA allocation table 517(a) shows the allocation of a certain virtual HBA 305 of a certain virtual computer 304 to a certain communication interface 303 of the computer 104. The virtual HBA allocation table 517(a) includes the following information with respect to each virtual HBA 305 of the virtual computer 304.

(*) A virtual HBA WWPN 801(b): The WWPN of each virtual HBA 305.

(*) The virtual computer ID 803: A unique identifier of each virtual computer to which the corresponding virtual HBA 305 is related.

(*) The communication interface WWPN 801(d): The WWPN of the communication interface 303 to which the virtual HBA 305 is allocated.

(\*) The computer ID 1002: A unique identifier of the computer 104 that has the communication interface 303 to which the virtual HBA 305 is related.

As shown in FIG. 7A, the virtual HBA 305 of the corresponding virtual computer 304 and the communication interface 303 of the computer 104 to which the virtual computer 304 belongs are coupled to each other one-on-one. In other words, for example, the management computer 106 couples a virtual HBA 305(*a*) of the virtual computer 304 to the communication interface 303(*a*) of the computer 104(*a*), and couples a virtual HBA 305(*b*) of the virtual computer 304 to a communication interface 303(*b*) of the computer 104(*a*). Therefore, the allocation of each virtual HBA 305 to the corresponding communication interface 303 is performed as shown in each row 1101 in the virtual HBA allocation table 517(*a*).

Here, the communication interface virtualization program 310 defines the plurality of WWPNs 801 with respect to one communication interface 303. This can be realized by using, for example, a technology called "NPIV (N_Port ID Virtualization).

FIG. 11B shows a composition example of a virtual HBA allocation table 517(*b*) of the storage apparatus 105.

The virtual HBA allocation table 517(*b*) shows the allocation of a certain virtual HBA 407 of a certain logical volume 402 to a certain communication interface 406 of the storage apparatus 105. The virtual HBA allocation table 517(*b*) includes the following information with respect to each virtual HBA 407 of the corresponding logical volume 402.

(\*) A virtual HBA WWPN 801(*a*): The WWPN of each virtual HBA 407.

(\*) The logical volume ID 802: A unique identifier of each logical volume 402 to which the corresponding virtual HBA 407 is related.

(\*) The communication interface WWPN 801(*c*): The WWPN of the communication interface 406 to which the virtual HBA 407 is allocated.

(\*) The storage apparatus ID 1004: A unique identifier of the storage apparatus 105 that has the communication interface 406 to which the virtual HBA 407 is allocated.

The management computer 106 (the virtual computer-to-logical volume communication path configuration program 504) searches for the communication interface WWPN 801 corresponding to the WWPN 801(*a*) of the virtual HBA 407 of the LV. This is because the virtual HBA 407 of the LV needs to be allocated to the communication interface of the storage apparatus so as to be able to communicate with the virtual HBA of the corresponding VM. The flow of this search is as follows, with an example of a process for searching for the communication interface WWPN 801 corresponding to the WWPN 801(*a*) of the virtual HBA 407, "407(*k*)-WWPN."

(S1) The management computer 106 searches the logical volume allocation table 512 for the virtual HBA WWPN 801(*b*) "305(*e*)-WWPN" for a corresponding VM, by using the WWPN 801(*a*) of the virtual HBA of the LV, "407(*k*)-WWPN," as a key (see a row 805 in FIG. 8).

(S2) The management computer 106 searches the virtual HBA allocation table 517(*a*) for the WWPN 801(*d*) "303(*c*)-WWPN" of the communication interface 303 of the computer 104, by using the WWPN 801(*b*) "305(*e*)-WWPN" searched in (S1) above, as a key (see a row 1103 in FIG. 11A).

(S3) The management computer 106 searches the communication interface allocation table 516(*a*) for the VLAN ID "101(*a*)," by using the WWPN 801(*d*) "303(*c*)-WWPN" searched in (S2) above, as a key (see a row 1006 in FIG. 10A).

(S4) The management computer 106 searches the virtual HBA allocation table 517(*b*) for the storage apparatus ID 1004 "105(*b*)," by using the virtual HBA WWPN 801(*a*) "407(*k*)-WWPN" as a key (see a row 1104 in FIG. 11B).

(S5) The management computer 106 searches the communication interface allocation table 516(*b*) for the communication interface WWPN 801(*c*) "406(*e*)-WWPN," by using the VLAN ID 902 "101(*a*)" searched in (S3) above and the storage apparatus ID 1004 "105(*b*)" searched in (S4) above, as keys (see a row 1007 in FIG. 10B).

As a result of the process described above, the allocation of each virtual HBA 407 to each communication interface 406 is obtained as shown in each row 1102 in the virtual HBA allocation table 517(*b*).

Note here that the communication interface virtualization program 410 defines the plurality of WWPNs 801 with respect to one communication interface 406. This can be realized by using, for example, a technology called "NPIV (N_Port ID Virtualization).

<<Configuration of Communication Path Between Computer and Storage Apparatus>>

As described in S602 of FIG. 6, the management computer 106 (the computer-to-storage apparatus communication path configuration program 506) configures the communication paths between the computers 104 and the storage apparatuses 105. The detail of S602 is described with reference to a process flow shown in FIG. 12.

In S1202, the management computer 106 refers to the fabric service allocation table 515 to perform configuration of the fabric services 207 provided to the edge apparatuses 101, and then allocates the VLAN IDs 902 to the fabric services 207.

In S1202, the management computer 106 performs configuration on the VLAN allocation table 212 of the edge apparatuses 101. Each of the edge apparatuses within the network has the VLAN allocation table 212. With reference to this table 212, the edge apparatuses 101 can identify the VLANs 110 to which the communication frames exchanged between the computers 104 and the storage apparatuses 105 belong.

Specifically, the management computer 106 extracts the MAC addresses 1001 and the VLAN IDs 902 of the communication interfaces from the communication interface allocation tables 516(*a*) and 516(*b*), and inputs these values to the VLAN allocation table 212 shown in FIG. 13. The VLAN allocation table 212 shows the allocation of a certain VLAN to a certain communication interface. For example, the VLAN allocation table 212 includes the following information with respect to each communication interface between each computer and each storage apparatus.

(\*) The MAC addresses 1001: The MAC addresses of the communication interfaces.

(\*) Protocols 1301: Information that shows communication protocols used in the communication using the communication interfaces.

(\*) The VLAN IDs 902: Unique identifiers of the VLANs allocated to the communication interfaces.

Furthermore, when designating the communication protocols, the management computer 106 also inputs, as the protocols 1301, values that express the designated communication protocols. When the communication protocols are not defined, the management computer 106 inputs "\*," for example, as a value indicating that the communication protocols are not defined.

The values of the VLAN allocation table 212 corresponding to those of the communication interface allocation tables 516(*a*) and 516(*b*) are shown in rows that belong to a range indicated by a reference numeral 1302. In other words, the values shown by the reference numeral 1302 are configured in the initial configuration.

In S1203, the management computer 106 transmits an instruction to the fabric service utilization program 411 of the storage apparatus 105, to cause the storage apparatus 105 to login to the functions that are provided by the fabric service 207 that is allocated the VLAN to which the storage apparatus belongs. In other words, the storage apparatus 105 logs into the fabric services that are provided by all of the edge apparatuses 101 coupled to the network. In addition to the fabric service that is provided by the edge apparatus 101 to which this storage apparatus 105 (itself) is directly coupled, the storage apparatus 105 also may login to the fabric services that are provided by the edge apparatuses 101 to which this storage apparatus 105 (itself) is not directly coupled (but coupled via the other edge apparatuses 101).

Moreover, in the case of the integrated apparatus, the storage apparatus 105 logs into the fabric services that are provided by the edge apparatuses 101 within all of the integrated apparatuses 109. In addition to the fabric service that is provided by the edge apparatus 101 within the integrated apparatus 109 to which this storage apparatus 105 (itself) belongs, the storage apparatus 105 may login to the fabric services that are provided by the edge apparatuses 101 within the other integrated apparatuses 109 on the network, to which the storage apparatus 105 (itself) does not belong. Note that the management computer 106 uses the logical volume configuration program 409 to configure each logical volume 402 beforehand.

Figure 14:
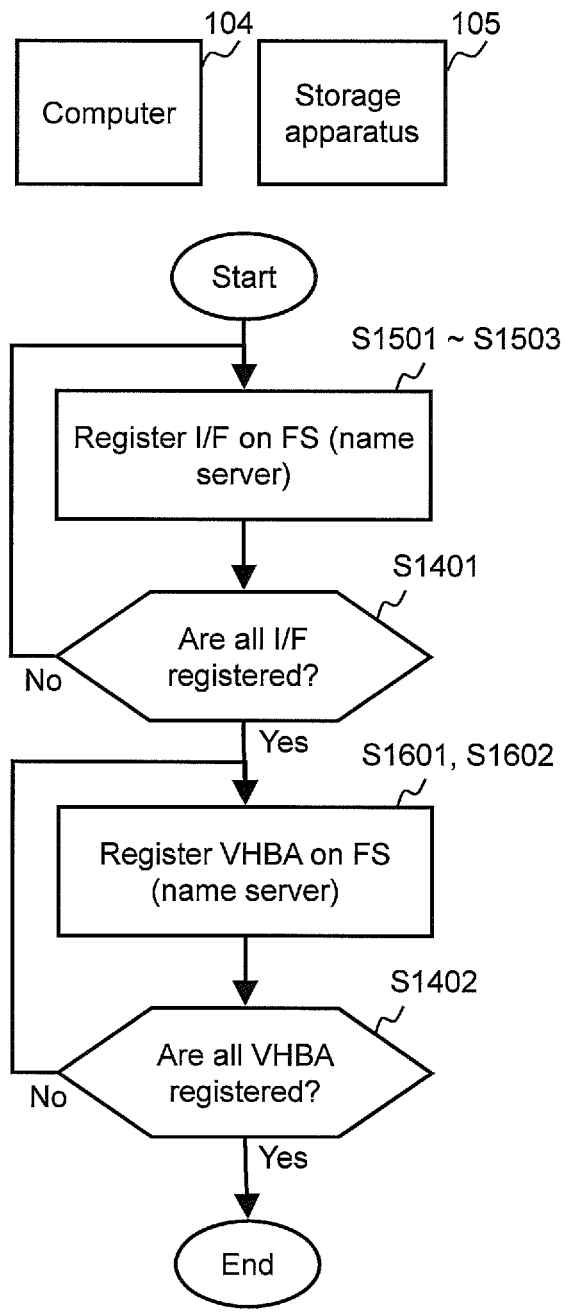
FIG. 14 is a flowchart showing a login process regarding a communication interface and virtual HBA.

FIG. 14 is a flowchart showing an example of a process flow of a login process (S1203) in which the storage apparatus 105 logs into the functions provided by the fabric services.

In S1501 to S1503 (see FIG. 15), the management computer 106 sends an instruction to the fabric service utilization program 411 of the storage apparatus 105, and the fabric service utilization program 411 registers the WWPNs 801 of the communication interfaces 406 into the name server functions of the fabric services 207 that are allocated the VLANs to which the WWPNs 801 belong.

In S1401, the management computer 106 refers to the communication interface allocation table 516(b) to determine whether all of the WWPNs 801 are registered in the name server functions. When the result of this determination is negative (S1404: No), the management computer 106 performs S1501 to S1503 for the unregistered WWPNs 801. In other words, the management computer 106 repeatedly performs S1501 to S1503 until all of the WWPNs 801 are registered in the name server functions.

In S1601 and S1602, the management computer 106 sends an instruction to the fabric service utilization program 411 of the storage apparatus 105, and the fabric service utilization program 411 registers the WWPNs 801 of the virtual HBAs 407 into the name server functions of the fabric services 207 that are allocated the VLANs to which the WWPNs 801 belong.

In S1402, the management computer 106 refers to the virtual HBA allocation table 517(b) to determine whether all of the WWPNs 801(a) are registered in the name server functions. When the result of this determination is negative (S1402: No), the management computer 106 performs S1601 and S1602 for the unregistered WWPNs 801(a). In other words, the management computer 106 repeatedly performs S1601 and S1602 until all of the WWPNs 801(a) are registered in the name server functions.

The processes of S1501 to S1503, S1601 and S1602 are carried out using a FIP (FCoE Initialization Protocol). The FIP is a protocol for initializing the FCoE.

Figure 15:
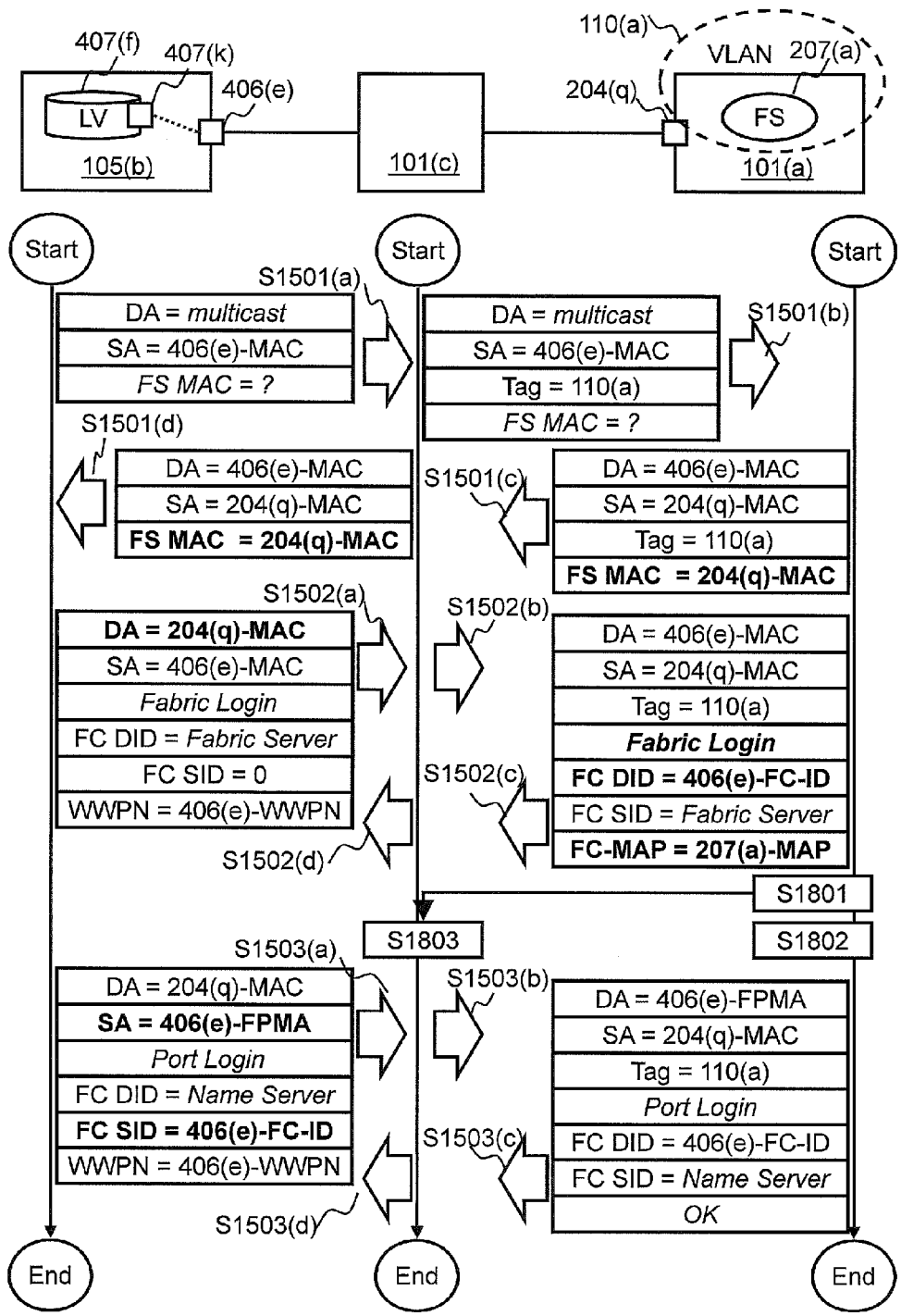
FIG. 15 is an explanatory diagram of a login process regarding the communication interface.

First, the processes from S1501 to S1503 are described using FIG. 15. FIG. 15 shows an example of a flow of a process for registering the WWPN 801 allocated to the communication interface 406(e) of the storage apparatus 105(b), into the name server function of the fabric service 207(a).

In S1501, the storage apparatus 105(b) searches for an available fabric service 207. Here, the available fabric service means a fabric service that is allocated to the VLAN corresponding to the communication interface 406(e). For example, the communication interface 406(e)-WWPN is allocated to the VLAN 110(a), and the VLAN 110(a) is allocated to the fabric service 207(a). Thus, the fabric service available to the communication interface 406(e)-WWPN is the fabric service 207(a). The MAC address of the edge apparatus 101 having the available fabric service 207 is inquired. Specifically, the following steps S1501(a) to S1501 (d), for example, are carried out.

In S1501(a), the storage apparatus 105(b) transmits the communication frame having the following information by means of multicast.

(*) A transmission destination MAC address (DA): Multicast (*) A transmission source MAC address (SA): "406(e)-MAC," which is the MAC address of the communication interface 406(e).

(*) "FS MAC=?": An identifier indicating that the MAC addresses of the fabric services (FS) 207 are inquired.

When the edge apparatus 101(c) receives the communication frame in S1501(b), the VLAN allocation table 212 is referenced based on the received communication frame, to determine the VLAN ID 902. Since the edge apparatus 101(c) does not have the available fabric service, the tag (IEEE 802.1Q tag) expressing the VLAN ID "110(a)" is inserted into the communication frame, and this communication frame is then transmitted by means of multicast.

Here, the edge apparatuses 101 determine the VLAN IDs 902 only for the communication frames received from the storage apparatuses 105 or the computers 104. In other words, the edge apparatuses 101 perform a tag insertion process only for transfer frames that are received from the communication interfaces 204(a) to 240(p) (FIGS. 7A and 7B) on the storage apparatuses 105 side or the computers 104 side. Note in the present embodiment that, even when the tag is inserted, determination of the value of the tag puts priority on the determination of the VLAN IDs performed by the edge apparatuses 101.

When the edge apparatus 101(a) receives the communication frame in S1501(c), the tag stored in the communication frame is referenced, and the VLAN 110(a) is extracted. Since the edge apparatus 101(a) has the available fabric service 207(a), the available fabric service 207(a) disposed in the VLAN 110(a) responses to the communication frame. Here, "204(q)-MAC" is returned as the MAC address of the fabric service 207(a) (FS MAC) that is used for the communication with the fabric service 207(a).

In S1501(d), the edge apparatus 101(c) receives the communication frame from the edge apparatus 101(a), removes the tag from the received communication frame, and transmits to the storage apparatus 105(b) the communication frame from which the tag is removed. The edge apparatuses 101 perform the tag removal process only for the transfer frames that are transmitted to the communication interfaces 204(a) to 240(p) (FIGS. 7A and 7B) on the storage apparatuses 105 side or the computers 104 side.

In S1502, the storage apparatus 105(b) acquires the FC ID allocated to the communication interface 406(e), from the fabric server function of the fabric service 207(a) provided by the edge apparatus 101(a). The storage apparatus 105(b) also acquires an FC-MAP (FCoE MAC Address Prefix). Note that the FC ID is a unique address that is used for transferring an FC frame in the FC network, as described above. The FC-MAP is 24-bit data defined with respect to each fabric service 207. In other words, the FCMAP varies when each fabric service 207 varies. The storage apparatus 105(b) combines the FC-MAP with the FC ID to create a new MAC address of the communication interface 406(e) (FPMA: Fabric Provided MAC Address). The FPMA is also a unique address. Specifically, for example, the following steps S1502(a) to S1502(d) are carried out in S1502.

In S1502(a), the storage apparatus 105(b) transmits a communication frame having the following information, to the fabric service 207(a).

(*) The transmission destination MAC address (DA): "204(q)-MAC," which is the address of the fabric service 207(a) (the value acquired in S1501).

(*) The transmission source MAC address (SA): "406(e)-MAC," which is the MAC address of the communication interface 406(e).

(*) "Fabric Login": An identifier indicating an access request for requesting access to the fabric server function.

(*) A transmission destination FC ID (FC DID): "Fabric Server" that expresses the fabric server function of the fabric service 207(a).

(*) A transmission source FC ID (FC SID): No values.

(*) WWPN: "406(e)-WWPN," which is the WWPN defined for the communication interface 406(e).

In S1502(b), the edge apparatus 101(c) receives the communication frame, as with the case in S1501(b). Then, the edge apparatus 101(c) refers to the VLAN allocation table 212 to determine the VLAN ID 902 that is allocated to the transmission source MAC address of the received communication frame. Because the VLAN allocated to the transmission source MAC address is not configured in the edge apparatus 101(c), the edge apparatus 101(c) inserts the tag into the communication frame and transmits to the edge apparatus 101(a) the communication frame into which the tag is inserted.

Since the VLAN allocated to the transmission source MAC address of the communication frame is configured in the edge apparatus 101(a), the fabric service 207(a) allocates the FC ID "406(e)-FC-ID" to the WWPN of the communication interface 406(e) "406(e)-WWPN" and returns the communication frame in S1502(c). This communication frame includes the "406(e)-FC-ID" as the transmission destination FC ID (FC DID) and "207(a)-MAP" as the FC-MAP.

In S1502(d), the edge apparatus 101(c) receives the communication frame from the edge apparatus 101(a), removes the tag from the received communication frame, and transmits to the storage apparatus 105(b) the communication frame from which the tag is removed.

Thereafter, in S1502(d), the storage apparatus 105(b) combines the FC-MAP "207(a)-MAP" with the FC ID "406(e)-FC-ID" that are acquired from the fabric service 207(a), to create a new MAC address (FPMA) of the communication interface 406(e), "406(e)-FPMA."

When determining the VLAN ID based on the MAC address of the communication interface frame, the VLAN ID cannot be determined accurately if the MAC address is changed dynamically. Therefore, in S1503 and the subsequent steps, the transmission source MAC address of the communication frame is replaced by the newly created MAC address (FPMA) "406(e)-FPMA." In other words, the newly created MAC address is a MAC address that is issued by the fabric service 207 and is not changed dynamically.

The present embodiment, therefore, implements a process for notifying each edge apparatus 101 of the change of the transmission source MAC address (S1801), and processes for updating the VLAN allocation table 212 (S1802, S1803).

Figures 17, 18A:
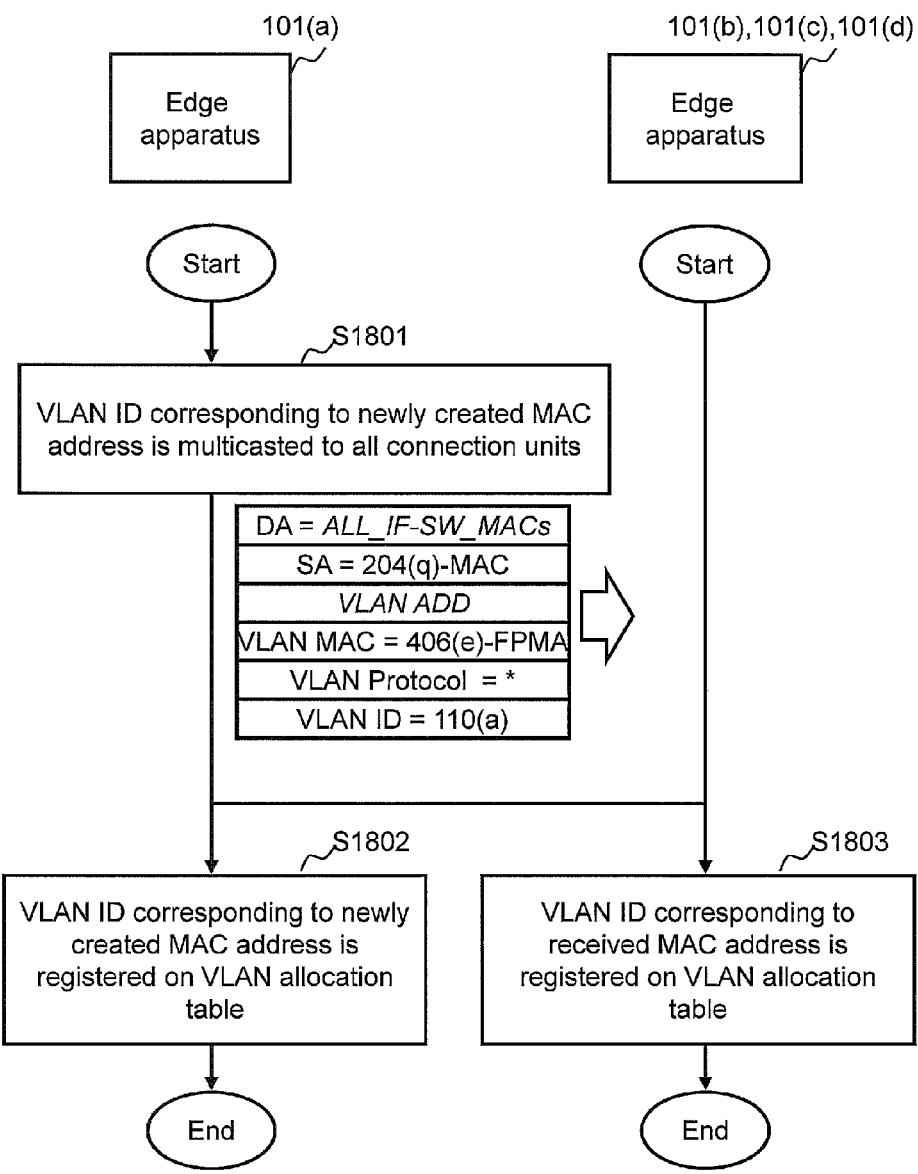
FIG. 17 is an explanatory diagram of an FC ID allocation table.
FIG. 18A is a flowchart showing a VLAN allocation table update process.

The processes S1801 to S1803 are described using FIG. 18A. These processes are carried out by the VLAN configuration program 206 of each edge apparatus 101.

In S1801, the edge apparatus 101(a) transmits the communication frame having the following information, to the other edge apparatuses 101(b), 101(c) and 101(d).

(*) Transmission destination MAC addresses (DA): "ALL_IF-SW_MACs" representing multicast addresses of all edge apparatuses 101.

(*) The transmission source MAC address (SA): "204(q)-MAC," which is the MAC address of a communication interface 204(q).

(*) "VLAN ADD": An identifier indicating a data addition request for requesting addition of data to the VLAN allocation table 212.

(*) VLAN MAC: A value that is registered as the MAC address 1001 in the VLAN allocation table 212.

(*) VLAN Protocols: Values that are registered as the protocols 1301 in the VLAN allocation table 212 ("FIP").

(*) VLAN ID: Values that are registered as the VLAN IDs 902 in the VLAN allocation table 212 ("110(a)").

The value "VLAN MAC," which is the new MAC address (FPMA) of the communication interface 406(e), is "406(e)-FPMA." This value is created by the edge apparatus 101(a) by combining the FC-MAP "207(a)-MAP" with the FC ID "406(e)-FC-ID." The value "VLAN Protocol" may be represented by "*" when no protocols are designated. In addition, "VLAN ID" is the VLAN ID corresponding to "406(e)-MAC" before the change.

In S1802, the edge apparatus 101(a) updates the VLAN allocation table 212 of the apparatus 101(a). The edge apparatus 101(a) registers a new row 1303 (see FIG. 13) into the VLAN allocation table 212, based on the data obtained in S1801.

In S1803, the edge apparatuses 101(b), 101(c) and 101(d) update the VLAN allocation tables 212 of these apparatuses on the basis of the data received in S1801, as with the case in S1802.

FIG. 15 is referenced again.

In S1503, the storage apparatus 105(b) registers, in the name server function of the fabric service 207(a), the WWPN defined for the communication interface 406(e) and the allocated FC ID. Specifically, the following steps S1503(a) to S1503(d), for example, are carried out in S1503.

In S1503(a), the storage apparatus 105(b) transmits the communication frame having the following information, to the fabric service 207(a).

(*) The transmission destination MAC address (DA): "204(q)-MAC," which is the address of the fabric service 207(a) (the value acquired in S1501).

(*) The transmission source MAC address (SA): "406(e)-FPMA," which is the new MAC address allocated to the communication interface 406(e).

(*) "Port Login": An identifier indicating an access request for requesting access to the name server function.

(*) The transmission destination FC ID (FC DID): "Name Server" expressing the name server function of the fabric service 207(a).

(*) The transmission source FC ID (FC SID): "406(*e*)-FC-ID," which is the FC ID allocated to the communication interface 406(*e*) (the value acquired in S1502).

(*) WWPN: "406(*e*)-WWPN," which is the WWPN defined for the communication interface 406(*e*).

In S1503(*b*), the edge apparatus 101(*c*) receives the communication frame and uses the updated VLAN allocation table 212 to determine the VLAN ID 902 of the received communication frame. Since the VLAN that is allocated to the MAC address of the communication frame included in the communication protocols is not configured in the edge apparatus 101(*c*), the edge apparatus 101(*c*) inserts the tag expressing the VLAN ID into the communication frame and transmits to the edge apparatus 101(*a*) the communication frame into which the tag is inserted.

In S1503(*c*), the fabric service 207(*a*) provided by the edge apparatus 101(*a*) receives the communication frame since the VLAN allocated to the transmission source MAC address of the communication frame is configured in the edge apparatus 101(*a*) and, based on this communication frame, registers the WWPN of the communication interface 406(*e*) "406(*e*)-WWPN" and the FC ID "406(*e*)-FC-ID" into the FC ID allocation table 213 shown in FIG. 17 (see a row 1702). In addition, the fabric service 207(*a*) returns the communication frame that indicates the successful registration. Note that the FC ID allocation table 213 is a table showing the allocation of a certain FC ID to a certain WWPN and is updated each time S1503(*c*) is performed. This table 213 is a table used by the name server function of the fabric service 207(*a*) to manage a correspondence relation between each WWPN 801 and each FC ID 1701 of each logged in apparatus.

In S1503(*d*), the edge apparatus 101(*c*) receives the communication frame from the edge apparatus 101(*a*), removes the tag from the received communication frame, and transmits to the storage apparatus 105(*b*) the communication frame from which the tag is removed.

Figure 16A:
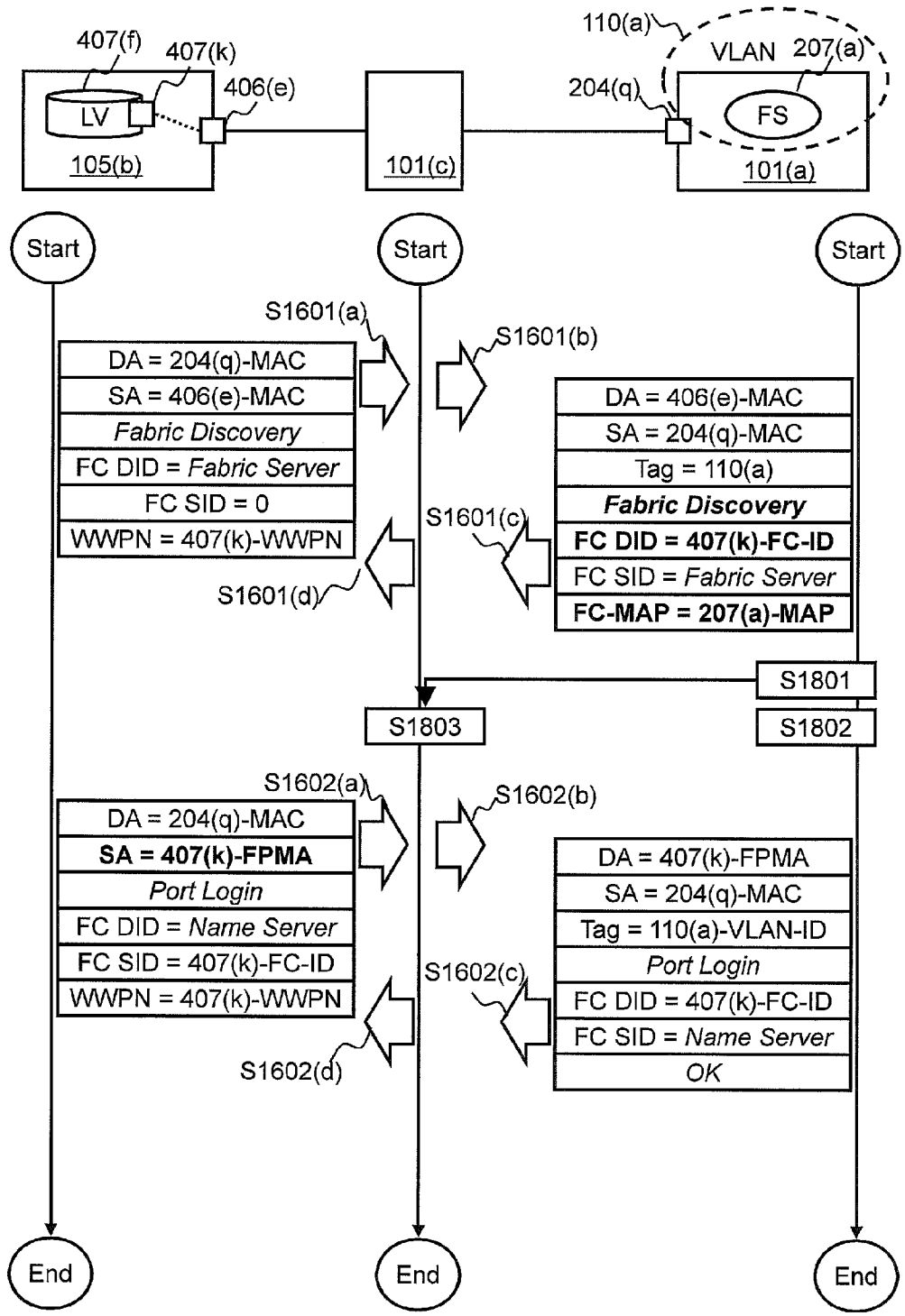
FIG. 16A is an explanatory diagram of a login process regarding the virtual HBA.

Next, the processes of S1601 and S1602 shown in FIG. 14 are described with reference to FIG. 16A. FIG. 16A shows an example of a flow of a process for registering, in the name server function of the fabric service 207(*a*), the WWPN 801 that is allocated to the virtual HBA 407(*k*) of the storage apparatus 105(*b*).

The management computer 106 searches, beforehand, for the MAC address of the communication interface 406 to which the virtual HBA 407(*k*) is allocated. The management computer 106 searches the virtual HBA allocation table 517(*b*) for the communication interface WWPN 801 "406(*e*)-WWPN" where the virtual HBA WWPN 801(*a*) corresponds to "407(*k*)-WWPN" (see the row 1104 in FIG. 11B). The management computer 106 further searches the communication interface allocation table 516(*b*) for the communication interface MAC address 1001 "406(*e*)-MAC" corresponding to the communication interface WWPN 801 "406(*e*)-WWPN" (see the row 1007 in FIG. 10B).

Subsequently, the management computer 106 controls the fabric service utilization program 411 of each storage apparatus 105 and executes the processes.

In S1601, the storage apparatus 105(*b*) acquires the FC ID allocated to the virtual HBA 407(*k*), from the fabric server function of the fabric service 207(*a*). The storage apparatus 105(*b*) also acquires the FC-MAP (FCoE MAC Address Prefix). This step S1601 is similar to the step S1502. For example, the following steps 1601(*a*) to S1601(*d*) are carried out in S1601.

In S1601(*a*), the storage apparatus 105(*b*) transmits the communication frame having the following information, to the fabric service 207(*a*).

(*) The transmission destination MAC address (DA): "204(*q*)-MAC," which is the address of the fabric service 207(*a*) (the value acquired in S1501).

(*) The transmission source MAC address (SA): "406(*e*)-MAC," which is the MAC address of the communication interface 406(*e*) (the value searched above).

(*) "Fabric Discovery": An identifier indicating an access request for requesting access to the fabric server function of the virtual HBA.

(*) The transmission destination FC ID (FC DID): "Fabric Server" that expresses the fabric server function of the fabric service 207(*a*).

(*) The transmission source FC ID (FC SID): No values.

(*) WWPN: "407(*k*)-WWPN," which is the WWPN defined for the virtual HBA 407(*k*).

In S1601(*b*), the edge apparatus 101(*c*) receives the communication frame, as with the case in S1501(*b*), and determines the VLAN ID 902 of the received communication frame. Since the VLAN that is allocated to the communication frame included in the communication protocols is not configured in the edge apparatus 101(*c*), the edge apparatus 101(*c*) inserts the tag into the communication frame and transmits to the edge apparatus 101(*a*) the communication frame into which the tag is inserted.

In S1601(*c*), when the edge apparatus 101(*a*) receives the communication frame, since the VLAN corresponding to the communication frame is configured in the edge apparatus 101(*a*), the allocated fabric service 207(*a*) allocates the FC ID "407(*k*)-FC-ID" to the WWPN of the virtual HBA 407(*k*), "407(*k*)-WWPN," and returns the communication frame. This communication frame includes "407(*k*)-FC-ID" as the transmission destination FC ID (FC DID) and "207(*a*)-MAP" as the FC-MAP.

In S1601(*d*), the edge apparatus 101(*c*) receives the communication frame from the edge apparatus 101(*a*), removes the tag from the received communication frame, and transmits to the storage apparatus 105(*b*) the communication frame from which the tag is removed.

The storage apparatus 105(*b*) combines the FC-MAP "207(*a*)-MAP" with the FC ID "407(*k*)-FC-ID" that are acquired from the fabric service 207(*a*), to create a new MAC address (FPMA) of the virtual HBA 407(*k*), "407(*k*)-FPMA."

In S1602 and the subsequent steps, the transmission source MAC address of the communication frame is replaced by the newly created MAC address (FPMA) "407(*k*)-FPMA." Therefore, the process for notifying each edge apparatus 101 of the change of the transmission source MAC address (S1801), and the processes for updating the VLAN allocation table 212 (S1802, S1803) are performed. The edge apparatus 101(*a*) registers a new row 1304 (see FIG. 13) in the VLAN allocation table 212.

In S1602, the storage apparatus 105(*b*) registers the WWPN defined for the virtual HBA 407(*k*) and the allocated FC ID, in the name server function of the fabric service 207(*a*). This step S1602 is similar to the step S1503. For example, the following steps S1602(*a*) to S1602(*d*) are carried out in S1602.

In S1602(*a*), the storage apparatus 105(*b*) transmits the communication frame having the following information, to the fabric service 207(*a*).

(*) The transmission destination MAC address (DA): "204(*q*)-MAC," which is the address of the fabric service 207(*a*) (the value acquired in S1501).

(*) The transmission source MAC address (SA): "407(*k*)-FPMA," which is the MAC address that is newly allocated to the virtual HBA 407(*k*).

(*) "Port Login": An identifier indicating an access request for requesting access to the name server function.

(*) The transmission destination FC ID (FC DID): "Name Server" expressing the name server function of the fabric service 207(a).

(*) The transmission source FC ID (FC SID): "407(k)-FC-ID," which is the FC ID allocated to the virtual HBA 407(k) (the value acquired in S1601).

(*) WWPN: "406(e)-WWPN," which is the WWPN defined for the virtual HBA 407(k).

In S1602(b), the edge apparatus 101(c) receives the communication frame, determines the VLAN ID 902 of the received communication frame by using the updated VLAN allocation table 212, inserts the tag into the communication frame, and transmits to the edge apparatus 101(a) the communication frame into which the tag is inserted.

In S1602(c), the fabric service 207(a) registers the WWPN of the virtual HBA 407(k), "407(k)-WWPN," and the FC ID "407(k)-FC-ID" in the FC ID allocation table 213 shown in FIG. 17 (see a row 1703). The fabric service 207(a) also returns the communication frame that indicates the successful registration.

In S1602(d), the edge apparatus 101(c) receives the communication frame from the edge apparatus 101(a), removes the tag from the received communication frame, and transmits to the storage apparatus 105(b) the communication frame from which the tag is removed.

Figure 12:
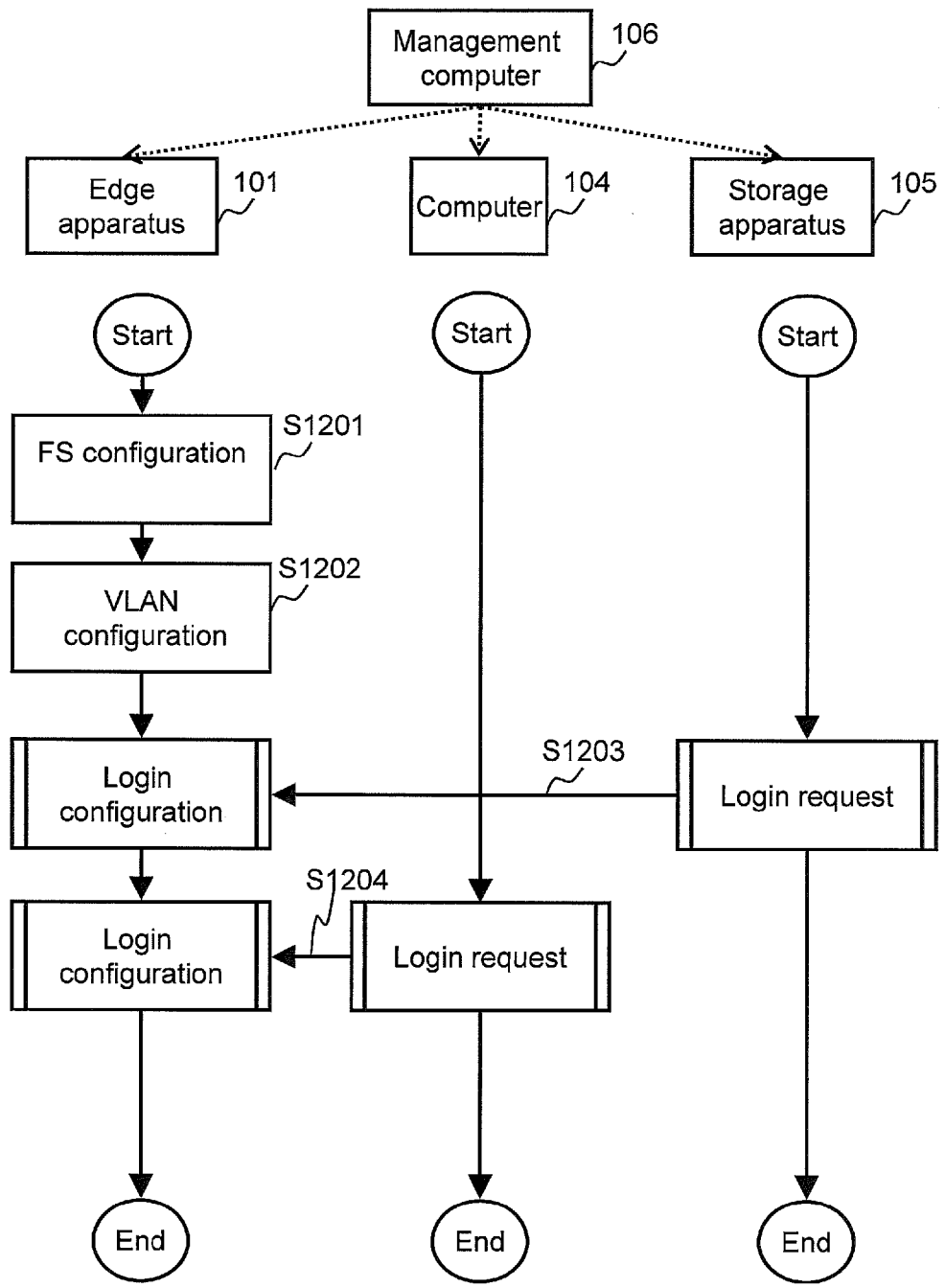
FIG. 12 is a flowchart showing a computer-to-storage apparatus communication path configuration process.

The above has described the detail of S1203 shown in FIG. 12.

Next, in S1204, the management computer 106 transmits an instruction to the fabric service utilization program 311 of the computer 104, to cause the computer 104 to login to the fabric services 207 configured in the edge apparatuses 101. Note that the management computer 106 uses the virtual computer configuration program 309 to allow each of the virtual computers 304 to be activated in the corresponding computer 104, beforehand.

The computer 104 registers the WWPNs 801 of all of the communication interfaces 303 and the WWPNs 801 of all of the virtual HBAs 305 in the name server functions of the corresponding fabric services 207 in accordance with the flow shown in FIG. 15 (the explanation of the detail of this process is omitted as it is the same as the login process of the storage apparatuses 105 described in S1203).

Furthermore, the management computer 106 configures control of the access (zoning) to the FC ID allocation table 213 within each edge apparatus 101. The management computer 106 also performs LUN (Logical Unit Number) masking in order to control the access to the logical volumes 402 of the storage apparatus 105.

In addition, in response to the operations by the management computer 106, the computer 104 acquires the information on the logical volumes 402 from the FC ID allocation table 213 of the fabric service 207, in accordance with an FC protocol. In accordance with the FC protocol, the management computer 106 allows an I/O process to be performed between the WWPN 801(b) of the virtual computer 304 and the virtual HBA 801(a) of the logical volume 402 that are registered in the logical volume allocation management table 512.

<<Configuration of Communication Path Between Computer and Computer>>

In S603 described in FIG. 6, the management computer 106 uses the computer-to-computer communication path configuration program 507 to configure the paths of communication networks between the computers 104. The management computer 106 configures the VLANs 110 for the communication between the computers, and registers the MAC addresses 1001, the protocols 1301, and the VLAN IDs 902 allocated thereto, in the VLAN allocation table 212. The management computer 106 performs the same configuration on a communication where the computers 104 are accessed from an external terminal apparatus (not shown) via the external network 107.

<<Configuration of Communication Path Qos>>

In S604, the management computer 106 uses a communication path QoS configuration program 664 to configure the edge apparatuses 101, and carries out priority control and bandwidth control on the communication paths between the computers 104 and the storage apparatus 105 and the communication paths between the computer 104 and the other computers 104. For example, bandwidths can be ensured by using IEEE 802.1Qaz Enhanced Transmission Selection (ETS), which is the Ethernet enhancement function.

The management computer 106 checks the number of data items registered in the VLAN allocation table 212 (the number of combinations of the MAC addresses 1001, protocols 1301 and VLAN IDs 902), and computes the number of connections between the computers 104, and the number of connections between the computers 104 and the storage apparatus 105. The management computer 106 configures bandwidths proportional to the number of connections between the computers 104 and the number of connections between the computers 104 and the storage apparatuses 105, with respect to the communications between the computers 104 and the communications between the computers 104 and the storage apparatuses 105.

A communication path configuration process that is performed when migrating each virtual computer 304 between the computers 104 is described next. Thereafter, a communication path configuration process that is performed when migrating each logical volume 402 between the storage apparatuses 105 is described. These processes are implemented by the management computer 106. These processes are implemented when renewing the computers 104, the storage apparatuses 105 or the integrated apparatuses 109.

<Path Configuration Process for Migrating Virtual Computer>

Figure 19:
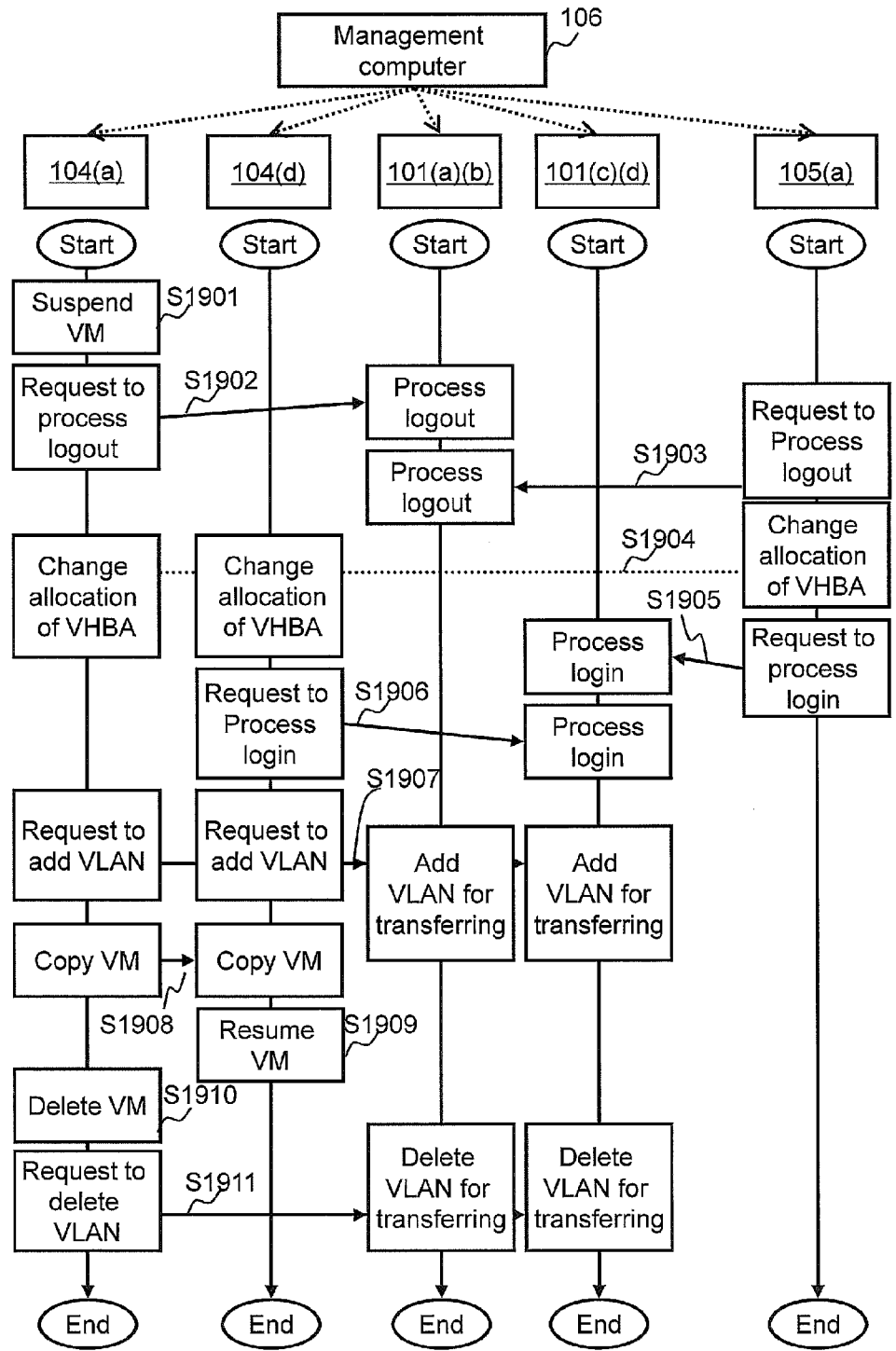
FIG. 19 is a flowchart showing a virtual computer migration process.
Figure 20:
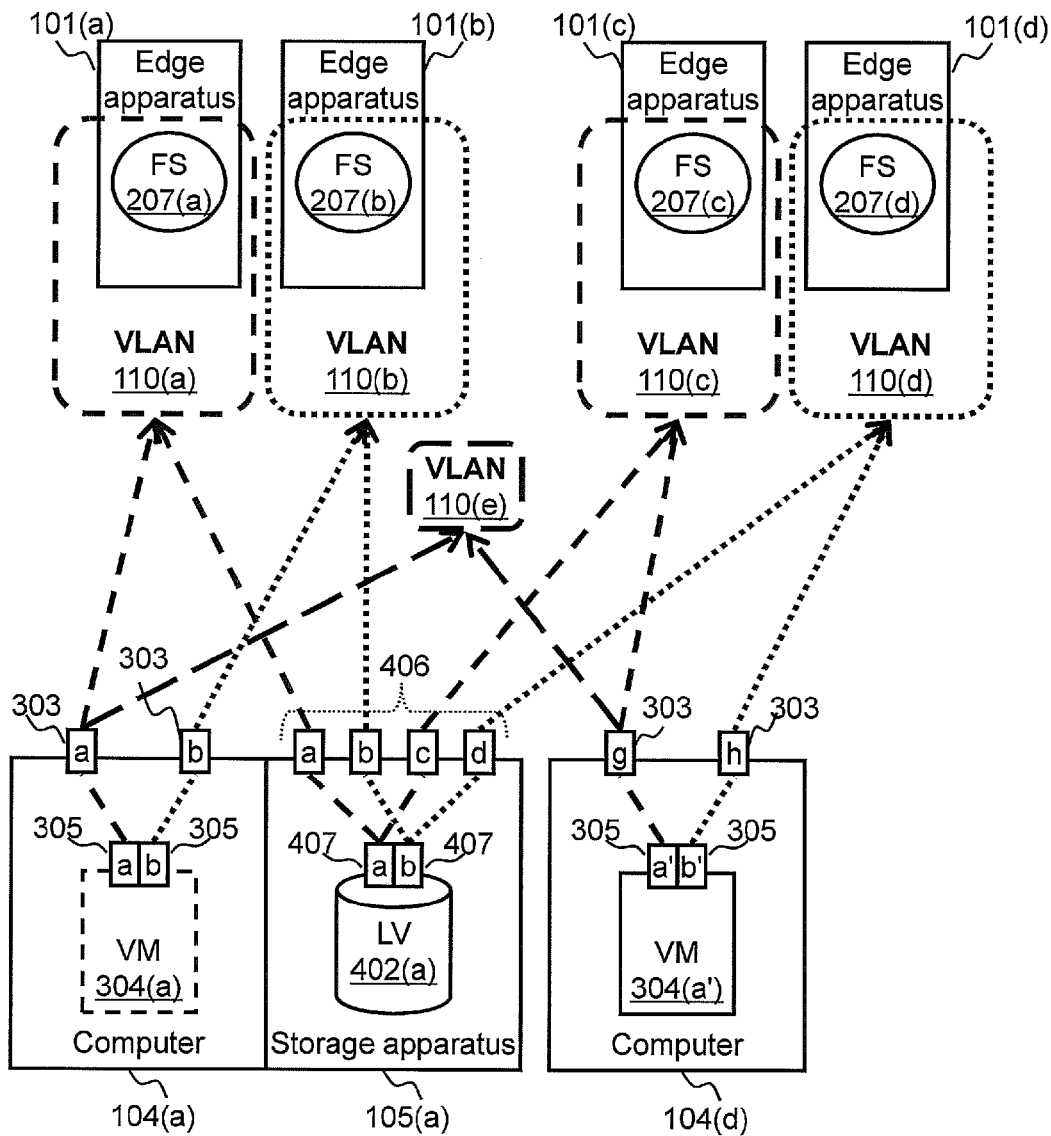
FIG. 20 is an explanatory diagram illustrating an outline of the virtual computer migration process.

As shown in a process flow of FIG. 19, the virtual computers 304 are migrated between the computers 104 in response to an instruction transmitted by the management computer 106 to the virtual computer migration program 509. The following describes the path configuration process for migrating the virtual computers, by taking an example in which the virtual computer 304(a) coupled to the logical volume 402(a) of the storage apparatus 105(a) is migrated from the computer 104(a) to the computer 104(d), as shown in FIG. 20. Note that the virtual computer before migration is denoted as the virtual computer 304(a) with the virtual HBAs 305(a), 305(b), and the virtual computer after migration is denoted as a virtual computer 304(a') with virtual HBAs 305(a') and 305(b').

In S1901, the computer 104(a) uses the virtual computer configuration program 309 to suspend the virtual computer 304(a) to be migrated. Specifically, for example, the computer 104(a) fixes the condition of the virtual computer 304(a) on the memory 302. For example, the computer 104(a) prevents the information indicating the condition of the virtual computer 304(a) on the memory 302 from being updated.

In S1902, the computer 104(a) transmits to the edge apparatus 101(a) a logout request for requesting the virtual HBA 305(a) of the virtual computer 304(a) to log out. In response to this request, the fabric service 207(a) performs a logout process. As a result, the virtual HBA 305(a) of the virtual computer 304(a) logs out from the fabric service 207(a).

While the virtual HBA 305(a) of the virtual computer 304(a) is logged into the fabric service 207(a) of the edge apparatus 101(a), the information of the virtual HBA 305(a) is registered in the following tables.

(*) The FC ID allocation table 213 of the edge apparatus 101(a).

(*) The VLAN allocation tables 212 of all of the edge apparatuses 101.

Figure 16B:
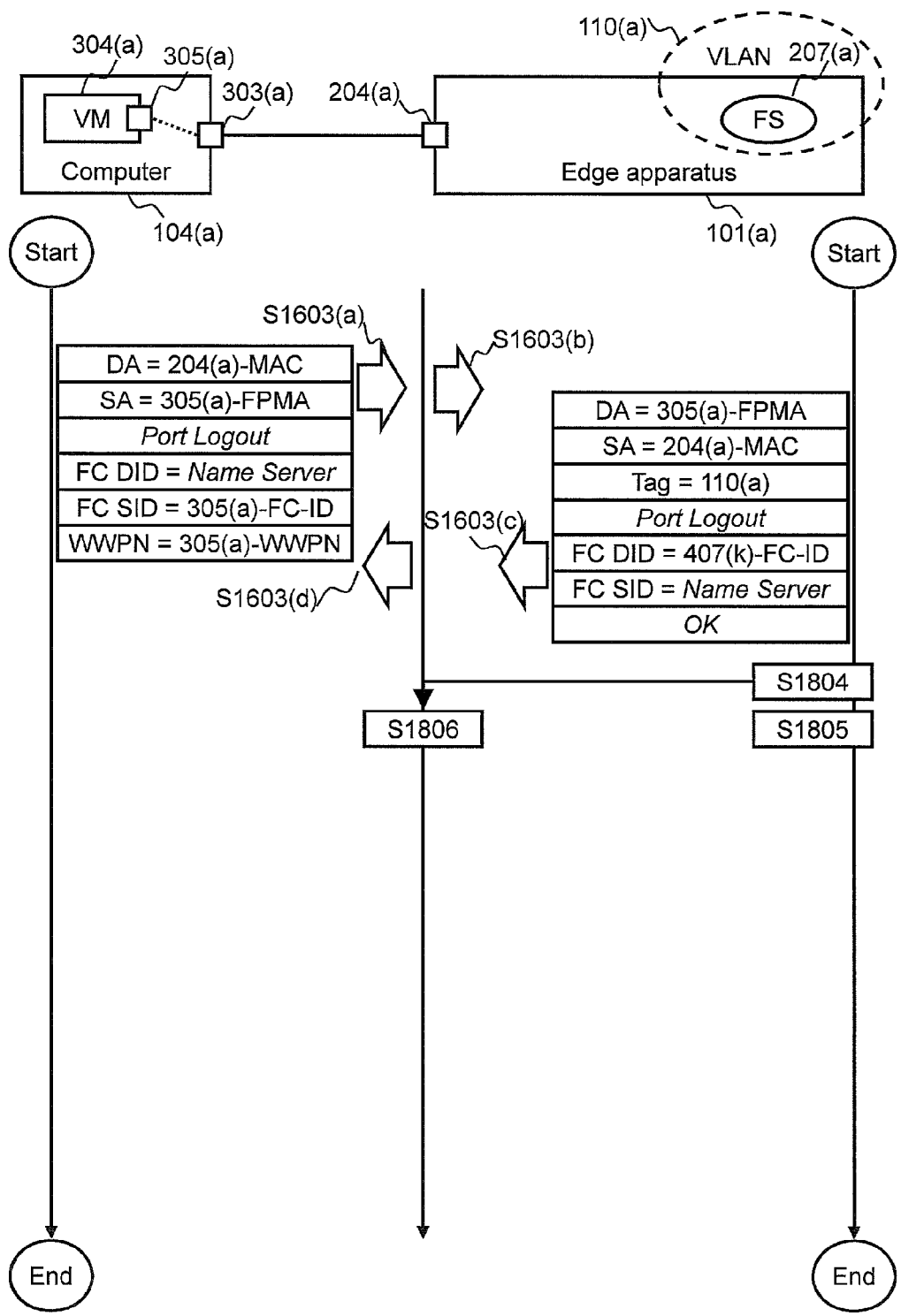
FIG. 16B is an explanatory diagram of a login process regarding the virtual HBA.

Hence, a process for deleting the information of the virtual HBA 305(a) from the abovementioned tables is carried out. This process is described hereinafter in detail with reference to FIG. 16B.

In S1603, the computer 104(a) deletes the WWPN defined for the virtual HBA 305(a) and the allocated FC ID from the name server function of the fabric service 207(a). Specifically, for example, the following steps S1603(a) to S1603(d) are carried out in S1603.

In S1603(a), the computer 104(a) transmits the communication frame having the following information, to the fabric service 207(a).

(*) The transmission destination MAC address (DA): "204(a)-MAC," which is the address of the fabric service 207(a).

(*) The transmission source MAC address (SA): "305(a)-FPMA," which is the MAC address that is allocated dynamically to the virtual HBA 305(a).

(*) "Port Logout": An identifier indicating a logout request for requesting logging out from to the name server function.

(*) The transmission destination FC ID (FC DID): "Name Server" representing the name server function of the fabric service 207(a).

(*) The transmission source FC ID (FC SID): "305(a)-FC-ID," which is the FC ID allocated to the virtual HBA 305(a).

(*) WWPN: "305(a)-WWPN," which is the WWPN defined for the virtual HBA 305(a).

In S1603(b), the edge apparatus 101(c) determines the VLAN ID 902 of the communication frame by using the VLAN allocation table 212 that is updated dynamically, inserts the tag into the communication frame, and transmits the communication frame into which the tag is inserted.

In S1603(c), the fabric service 207(a) receives the communication frame, and, based on this communication frame, deletes the WWPN of the virtual HBA 305(a) "305(a)-WWPN" and the FC ID "305(a)-FC-ID" that are registered in the FC ID allocation table 213. The fabric service 207(a) also returns the communication frame that indicates the successful deletion.

In S1603(d), the edge apparatus 101(a) receives the communication frame, removes the tag from the received communication frame, and transmits to the computer 104(a) the communication frame from which the tag is removed.

Figure 18B:
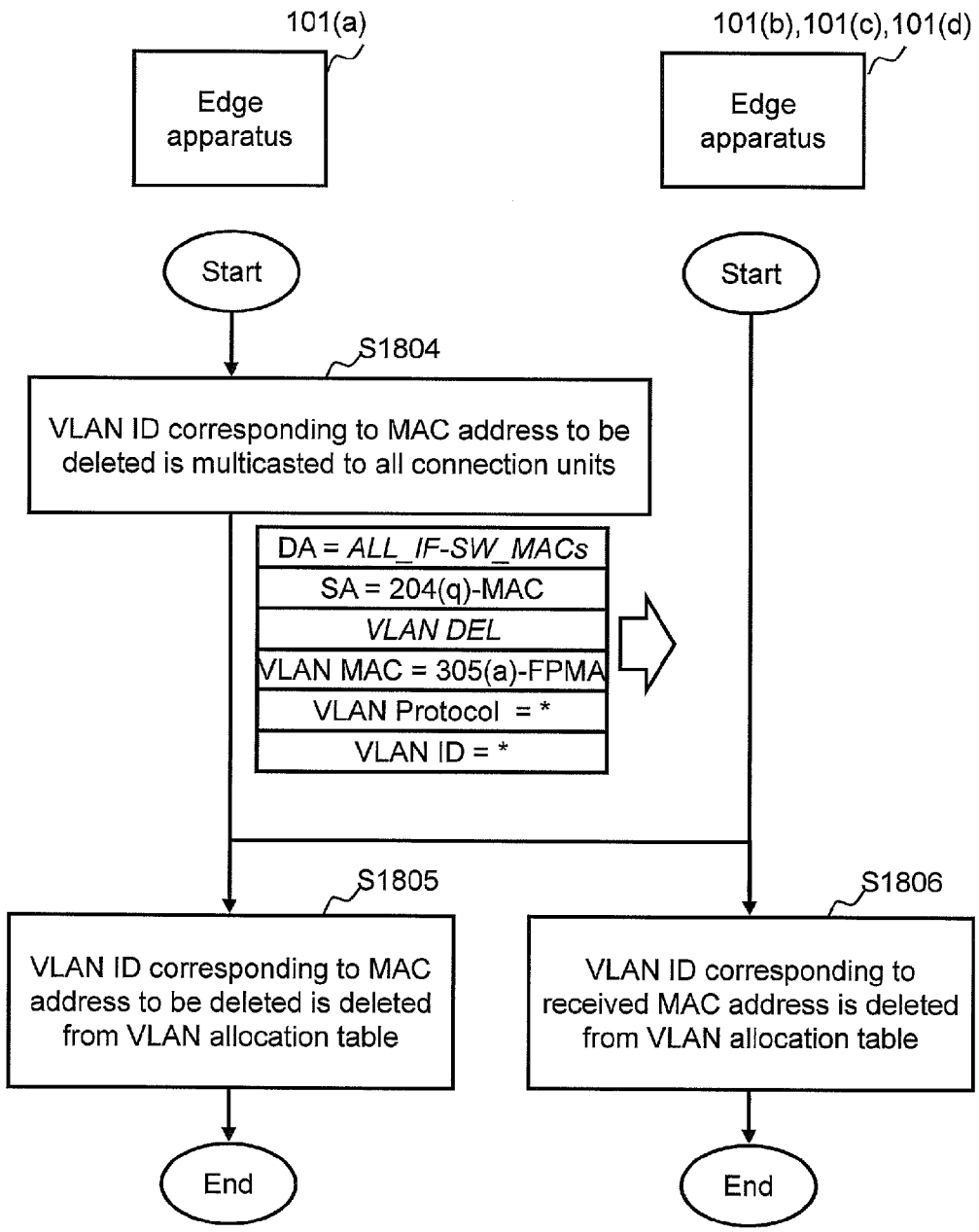
FIG. 18B is a flowchart showing a VLAN allocation table update process.

Subsequently, the edge apparatus 101(a) deletes the information on the virtual HBA 305(a) from the VLAN allocation table 212 of the edge apparatus 101(a). The information registered in the VLAN allocation table 212 of the edge apparatus 101(a) is the MAC address (FPMA) that is dynamically created for the virtual HBA 305(a), as described in the login process of the virtual HBA in S1601. In order to delete this address from the VLAN allocation table 212, the edge apparatus 101(a) implementes the following processes shown in FIG. 18B. These are executed using the VLAN configuration program 206 of the edge apparatus 101.

In S1804, the edge apparatus 101(a) transmits the communication frame having the following information, to the other edge apparatuses 101(b), 101(c) and 101(d).

(*) The transmission destination MAC addresses (DA): "ALL_IF-SW_MACs" representing multicast addresses of all edge apparatuses 101.

(*) The transmission source MAC address (SA): "204(q)-MAC," which is the MAC address of the communication interface 204(q).

(*) "VLAN DEL": An identifier indicating a data deletion request for requesting a deletion of data from the VLAN allocation table 212.

(*) VLAN MAC: The MAC address deleted from the VLAN allocation table 212.

(*) VLAN Protocols: Values representing the protocols 1301 in the VLAN allocation table 212 ("FIP," but the VLAN protocols may be represented by "*" when no protocols are specified).

(*) VLAN ID: Values representing the VLAN IDs 902 in the VLAN allocation table 212 ("110(a)," but the value "*" may be used when not specified).

Here, "VLAN MAC" is the MAC address (FPMA) "305(a)-FPMA" that is dynamically created with respect to the communication interface 305(a). This value is created by the edge apparatus 101(a) by combining the FC-MAP "207(a)-MAP" with the FC ID "305(a)-FC-ID."

In S1805, the edge apparatus 101(a) updates the VLAN allocation table 212 of this edge apparatus 101(a). Based on the communication frame obtained in S1804, the edge apparatus 101(a) specifies the relevant row in the VLAN allocation table 212, and deletes the information shown in the specified row, from the VLAN allocation table 212.

S1806: Based on the communication frame obtained in S1804, the edge apparatuses 101(b), 101(c) and 101(d) update the VLAN allocation tables 212 thereof, as with the case in S1805.

The computer 104(a) transmits the logout request to the edge apparatus 101(b), with regard to the virtual HBA 305(b) as well. The edge apparatus 101(b) performs a process for deleting the information on the virtual HBA 305(b), as with the case in the process described above.

FIG. 19 is referenced again.

In S1903, the storage apparatus 105(a) transmits to the edge apparatus 101(a) a logout request for requesting the virtual HBA 407(a) of the LV 402(a) to log out, and then the fabric service 207(a) performs a logout process. The detail of this process is same as that of S1902. With regard to the virtual HBA 407(b) as well, the same process is carried out. As a result, the virtual HBA 407(a) of LV 402(a) of the storage apparatus 105(a) logs out from the fabric service 207(a).

In S1904, the management computer 106 changes the allocations of the virtual HBAs 407 of the computers 104(a), 104(d) and storage apparatus 105(d) to the communication interfaces 406.

Specifically, first, the management computer 106 updates the virtual HBA allocation table 517(a) with respect to the computers 104(a) and 104(d) in response to the migration of the virtual computer 304(a). The management computer 106 changes the communication interface WWPN 801(d) "303(a)-WWPN", which is allocated the virtual HBA WWPN 801(b) "305(a)-WWPN" (see a row 1105 in FIG. 11A), to the communication interface WWPN 801(d) "303(g)-WWPN" (see a row 1107 in FIG. 11A). Similarly, the management computer 106 changes the communication interface WWPN 801(d) "303(b)-WWPN," which is allocated the virtual HBA WWPN 801(b) "305(b)-WWPN" (see a row 1106 in FIG. 11A), to the communication interface WWPN 801(d) "303(h)-WWPN" (see a row 1108 in FIG. 11A).

Furthermore, the management computer 106 updates the communication interface allocation table 517(b) with respect to the storage apparatus 105(a). The management computer 106 uses the virtual computer-to-logical volume communication path configuration program 504 to search for a new communication interface WWPN corresponding to the virtual HBA WWPN 801(a) "407(a)-WWPN" of the storage apparatus 105, in response to the abovementioned changes of the allocations of the virtual HBA 305(a) of the virtual computer 304. This search process is same as the search process performed on the virtual HBA allocation table 517(b) in S601.

Based on the results of this search, the management computer 106 changes the communication interface WWPN 801(c) "406(a)-WWPN," which is allocated the virtual HBA WWPN 801(a) "407(a)-WWPN" (see a row 1109 in FIG. 11B), to the communication interface WWPN 801(c) "406(c)-WWPN" (see a row 1111 in FIG. 11B). Similarly, the management computer 106 changes the communication interface WWPN 801(c) "406(b)-WWPN," which is allocated the virtual HBA WWPN 801(a) "407(b)-WWPN" (see a row 1110 in FIG. 11B), to the communication interface WWPN 801(c) "406(d)-WWPN" (see a row 1112 in FIG. 11B).

In S1905, the storage apparatus 105(a) transmits a login request with regard to the virtual HBA 407(a) to the edge apparatus 101(c), in response to the change of the allocation of the virtual HBA 407(a) to the communication interface 406(c) in S1904. The fabric service 207(c) of the edge apparatus 101(c) registers the WWPN of the virtual HBA 407(a) in the name server function. This process is same as the processes described in S1601 and S1602.

Also, the storage apparatus 105(a) transmits a login request with regard to the virtual HBA 407(b) to the edge apparatus 101(d), and carries out the same process.

In S1906, as with S1905, the computer 104(d) transmits login requests with regard to the virtual HBAs 305(a') and 305(b') to the edge apparatuses 101(c) and 101(d) respectively, in response to the changes of the allocations of the virtual HBAs 305(a) and 305(b) to the communication interface 406 in S1904. In response to this, the edge apparatuses 101(c) and 101(d) implements the process.

In S1907, prior to copying the virtual computer 304(a) (S1908), the computer 104(a) requests the edge apparatus 101 to allocate a special VLAN 110(e) for a communication to copy the virtual computer 304(a). This can distinguish the communication to copy the virtual computer 304(a) from the other communications and place priorities. The process of adding the VLAN 110(e) is same as the processes described in S1801 and S1803.

The computer 104(a) uses the VLAN configuration program 312 to transmit the communication frame having the following information, to the edge apparatuses 101.

(*) The transmission destination MAC addresses (DA): "ALL_IF-SW_MACs" representing multicast addresses of all edge apparatuses 101.

(*) The transmission source MAC address (SA): "303(a)-MAC," which is the MAC address of the communication interface 303(a).

(*) "VLAN ADD": An identifier indicating a data addition request for requesting an addition of data to the VLAN allocation table 212.

(*) VLAN MAC: Values representing the MAC addresses 1001 in the VLAN allocation table 212 (the MAC address of the communication interface 303(a), "303(a)-MAC").

(*) VLAN Protocols: Values representing the protocols 1301 in the VLAN allocation table 212 ("FTP" of a copy protocol (FTP: File Transfer Protocol)).

(*) VLAN ID: Values representing the VLAN IDs 902 in the VLAN allocation table 212 (the ID of a copy VLAN, "110(e)").

The edge apparatus 101 that receives the communication frame registers an allocation of the VLAN ID "110(e)" in the VLAN allocation table 212 (see a row 1305 in FIG. 13). In this case, when the transmission source MAC address is "303(a)-MAC" and the protocol is "FTP," the VLAN ID is "110(e)," but the VLAN ID becomes "110(a)" with a different protocol.

Similarly, the computer 104(b) also uses the VLAN configuration program 312 to request the edge apparatus 101 to allocate the VAN ID "110(e)" in the VLAN allocation table 212 (see a row 1306 in FIG. 13).

In S1908, the computer 104(a) uses the virtual computer configuration program 309 to copy the suspended virtual computer 304(a) to the computer 104(d).

In S1909, the computer 104(d) resumes the copied virtual computer 304(a') to reactivate it.

In S1910, the management computer 106 confirms that the virtual computer 304(a') is correctly activated on the computer 104(d), and thereafter causes the computer 104(a) to use the virtual computer configuration program 309 to delete the virtual computer 304(a).

After the virtual computer 304(a) is deleted (S1910), in S1911 the computer 104(a) requests for a deletion of the allocation of the VLAN 110(e) for copying the virtual computer 304(a). The process for deleting the allocation of the VLAN 110(e) is same as the processes described in S1804 and S1806.

The computer 104(a) uses the VLAN configuration program 312 to transmit the communication frame having the following information, to the edge apparatuses 101.

(*) The transmission destination MAC addresses (DA): "ALL_IF-SW_MACs" representing multicast addresses of all edge apparatuses 101.

(*) The transmission source MAC address (SA): "303(a)-MAC," which is the MAC address of the communication interface 303(a).

(*) "VLAN DEL": An identifier indicating a data deletion request for requesting a deletion of data from the VLAN allocation table 212.

(*) VLAN MAC: Values representing the MAC addresses 1001 in the VLAN allocation table 212 (the MAC address of the communication interface 303(a), "303(a)-MAC").

(*) VLAN Protocols: Values representing the protocols 1301 in the VLAN allocation table 212 ("FIP," the copy protocol).

(*) VLAN ID: Values representing the VLAN IDs 902 in the VLAN allocation table 212 (the ID of a copy VLAN, "110(e)").

The edge apparatus 101 that receives the communication frame deletes, from the VLAN allocation table 212, the information shown in a row that is specified based on this communication frame (see the row 1305 in FIG. 13).

As described above, when moving the VM, the virtual HBA of the VM to be moved and the virtual HBA of the LV corresponding to the VM to be moved can be logged out from the functions of the fabric services into which these virtual HBAs are logged in, without changing the login conditions of the computer 104(a), computer 104(d) and storage apparatus 105(a) in the functions of the fabric services. Then, the VM to be moved and the LV corresponding to this VM can log into the functions of the fabric service that is provided by the edge apparatus 101 that is directly coupled to the computer 104(*d*) to which the VM is moved, whereby a communication can be established. Therefore, even when the VM is moved to any of the computers, the communication with the corresponding LV can be restarted by using the functions of the fabric service that is provided by the edge apparatus 101 that is directly coupled to the computer to which the VM is moved.

<Path Configuration Process for Migrating Logical Volume>

Figure 21:
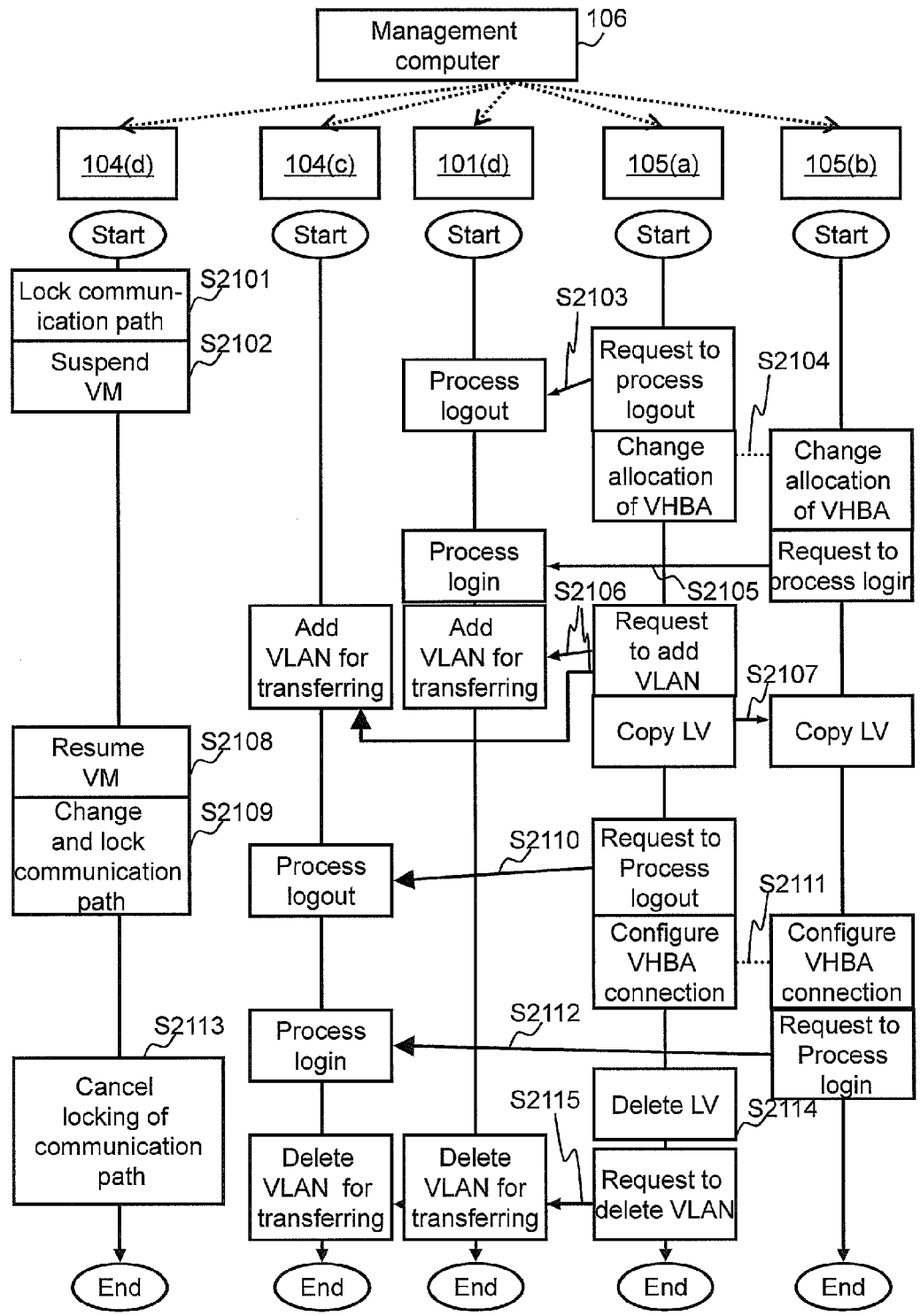
FIG. 21 is a flowchart showing a logical volume migration process.
Figure 22:
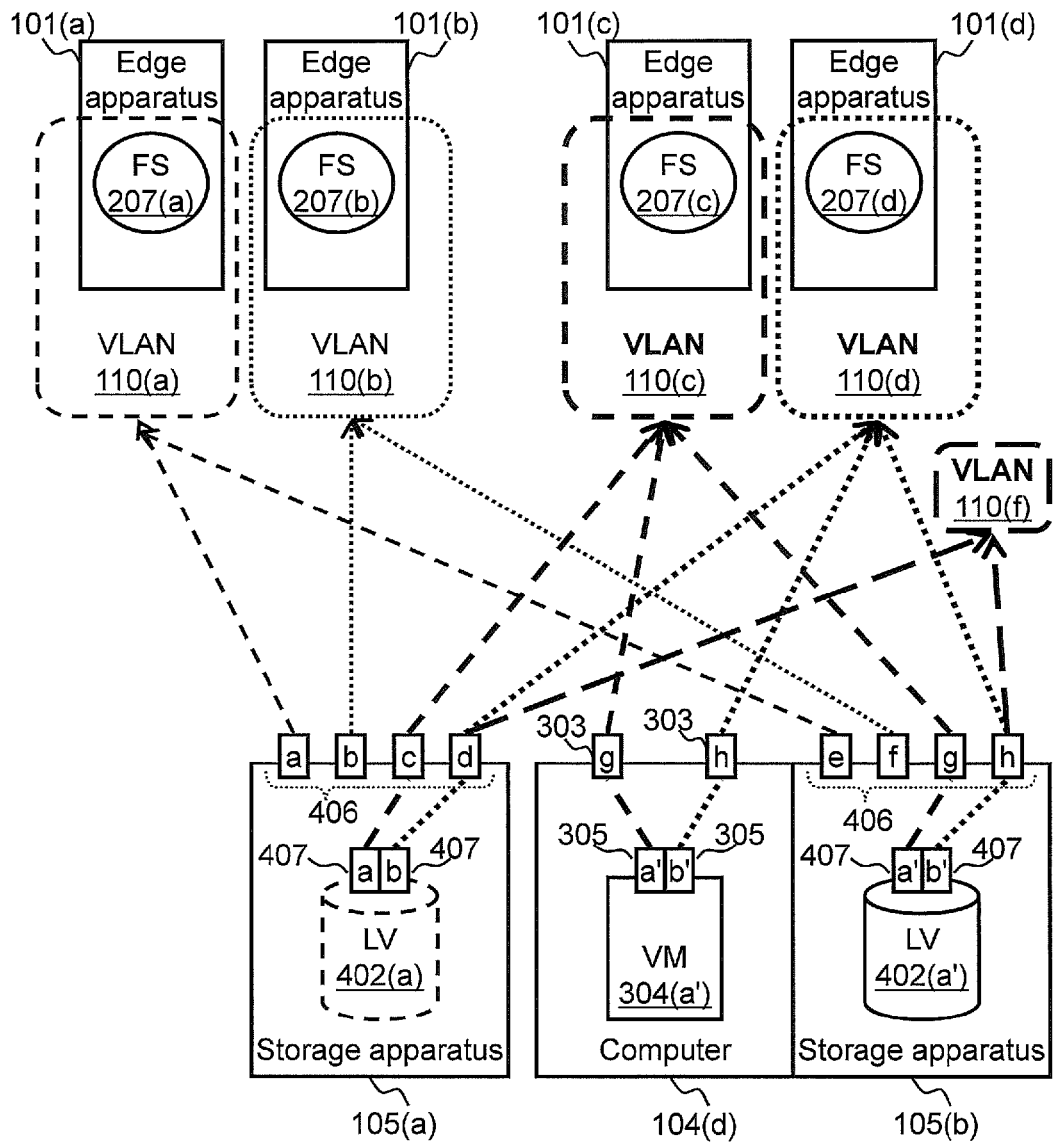
FIG. 22 is an explanatory diagram illustrating an outline of the logical volume migration process.

As shown in a process flow of FIG. 21, the storage apparatuses 105 migrate the logical volumes 402 in response to an instruction sent to the logical volume migration program 510 by the management computer 106. The following describes a path configuration process for migrating the logical volumes, by taking an example in which the logical volume 402(*a*) coupled to the virtual computer 304(*a*) of the computer 104 (*d*) is migrated from the storage apparatus 105(*a*) to the storage apparatus 105(*b*), as shown in FIG. 22. Note that the logical volume before migration is denoted as the logical volume 402(*a*) with the virtual HBAs 407(*a*), 407(*b*), and the logical volume after migration is denoted as a logical volume 402(*a'*) with virtual HBAs 407(*a'*) and 407(*b'*).

In S2101, the computer 104(*d*) uses the communication path control program 313 to make only the path between the virtual HBA 305(*a'*) and the virtual HBA 407(*a*) available and the path between the virtual HBA 305(*b'*) and the virtual HBA 407(*b*) unavailable, in terms of the path between the virtual computer 304(*a'*) and the logical volume 402(*a*). For example, the computer 104 manages a plurality of paths and further manages status information that indicates the availability/unavailability of each of the paths. Changing the status information of a certain path from the information indicating the unavailability to the information indicating the availability is an example of "making a path available."

In S2102, the computer 104(*d*) uses the virtual computer configuration program 309 to lock (suspend) the condition of the virtual computer 304(*a'*) on the memory 302. For example, the computer 104(*d*) prevents the information indicating the condition of the virtual computer 304(*a*) on the memory 302 from being updated.

In S2103, the storage apparatus 105(*a*) transmits to the edge apparatus 101(*d*) a logout request for requesting the virtual HBA 407(*b*) of the LV 402(*a*) to log out. In response to this request, the fabric service 207(*d*) performs a logout process on the virtual HBA 407(*b*) of the LV 402(*a*). this process is same as the process of S1902. As a result, the virtual HBA 407(*b*) of the LV 402(*a*) of the storage apparatus 105(*a*) logs out from the fabric service 207(*d*).

In S2104, the management computer 106 changes the allocation of the virtual HBA 407(*b*) of the storage apparatus 105(*a*) to the communication interface 406(*d*), to the allocation of the virtual HBA 407(*b'*) of the storage apparatus 105 (*b*) to a communication interface 406(*h*). Accordingly, the management computer 106 updates the virtual HBA allocation table 517(*b*).

The management computer 106 uses the virtual computer-to-logical volume communication path configuration program 504, to search for a new communication interface WWPN corresponding to the virtual HBA WWPN 801(*a*) of the storage apparatus 105(*b*), "407(*b'*)-WWPN," in response to the migration of the logical volume 402(*a*) from the storage apparatus 105(*a*) to the storage apparatus 105(*b*). This search process is same as the process performed on the virtual HBA allocation table 517(*b*) in S601.

Based on the result of this search, the communication interface WWPN 801(*c*) "406(*d*)-WWPN," which is allocated the virtual HBA WWPN 801(*a*) "407(*b*)-WWPN" (see the row 1112 in FIG. 11B), is changed to the communication interface WWPN 801(*c*) "406(*h*)-WWPN." (see the row 1113 in FIG. 11B).

In S2105, in accordance with the allocation of the virtual HBA 407(*b'*) to the communication interface 406(*h*) in S2104, the storage apparatus 105(*b*) transmits a login request with regard to the virtual HBA 407(*b'*) to the edge apparatus 101(*d*). In response to this login request, the fabric service 207(*d*) of the edge apparatus 101(*d*) performs the login process. This process is same as the process of S1905 (processes described in S1601 and S1602).

In S2106, prior to copying the logical volume 402(*a*) (S2107), the storage apparatus 105(*a*) uses the VLAN configuration program 412 to request the edge apparatus 101 to allocate a special VLAN 110(*f*) for a communication to copy the logical volume 402(*a*). The edge apparatus 101 that receives the request registers an allocation of the VLAN ID "110(*f*)" in the VLAN allocation table 212. This process is same as the process described in S1907.

In S2107, the storage apparatus 105(*a*) uses the logical volume configuration program 409 to copy the logical volume 402(*a*) to the storage apparatus 105(*b*) (e.g., to copy all the data within the logical volume 402(*a*) to the logical volume within the storage apparatus 105(*b*)). After copying, the logical volume 402(*a*) within the storage apparatus 105(*a*) is in synchronization with the copy destination logical volume 402(*a'*) of the storage apparatus 105(*b*).

In S2108, the computer 104(*d*) resumes the suspended virtual computer 304(*a'*) to reactivate it.

Simultaneously with resuming the virtual computer 304 (*a'*), in S2109 the computer 104(*d*) uses the communication path control program 313 to make only the path between the virtual HBA 305(*b'*) and the virtual HBA 407(*b'*) available and the path between the virtual HBA 305(*a'*) and the virtual HBA 407(*a*) unavailable.

As a result, the communication path extending from the virtual computer 304(*a'*) to the logical volume 402(*a*) is switched to the communication path extending from the virtual computer 304(*a'*) to the logical volume 402(*a'*).

In S2110, the storage apparatus 105(*a*) transmits a logout request with regard to the virtual HBA 407(*a*) to the edge apparatus 101(*c*), as with the case in S2103. In response to this logout request, the fabric service 207(*c*) performs the logout process. As a result, the virtual HBA 407(*a*) of the LV 402(*a*) of the storage apparatus 105(*a*) logs out from the fabric service 207(*c*).

As with the case of S2104, in S2111 the management computer 106 changes the allocation of the virtual HBA 407 (*a*) of the storage apparatus 105(*a*) to the communication interface 406(*c*), to the allocation of the virtual HBA 407(*a'*) of the storage apparatus 105(*b*) to a communication interface 406(*g*). Accordingly, the management computer 106 updates the virtual HBA allocation table 517(*b*).

In the virtual HBA allocation table 517(*b*), the communication interface WWPN 801(*c*) "406(*c*)-WWPN," which is allocated the virtual HBA WWPN 801(*a*) "407(*a*)-WWPN" (see the row 1111 in FIG. 11B), is changed to the communication interface WWPN 801(*c*) "406(*g*)-WWPN" (see a row 1114 in FIG. 11B).

As with the case in S2105, in S2112 the storage apparatus 105(*b*) transmits a login request with regard to the virtual HBA 407(*a'*) to the edge apparatus 101(*c*), in accordance with the allocation of the virtual HBA 407(*a'*) to the communication interface 406(*g*) obtained in S2111. The fabric service 207(*c*) of the edge apparatus 101(*c*) performs the login process in response to this login request. As a result, the virtual HBA 407(a') of the LV 402(a') of the storage apparatus 105(b) logs into the fabric service 207(c).

In S2113, the computer 104(d) uses the communication path control program 313 to make the path between the virtual HBA 305(a') and the virtual HBA 407(a') available.

In S2114, the management computer 106 confirms that the virtual computer 304(a') communicates with the logical volume 402(a') correctly, and thereafter causes the storage apparatus 105(a) to use the logical volume configuration program 409 to delete the logical volume 402(a).

In S2115, after the logical volume 402(a) is deleted (S2114) the storage apparatus 105(a) uses the VLAN configuration program 412 to request for a deletion of the allocation of the VLAN 110(f) for copying the logical volume 402(a). This process is same as the process of S1911.

As described above, when moving the LV, the virtual HBA of the LV to be moved logs out from the functions of the fabric service into which this virtual HBA is logged in, without changing the login conditions of the computer 104 and storage apparatus 105 in the functions of the fabric service. Then, the virtual HBA of the LV can log into the functions of the fabric service that is provided by the edge apparatus 101 that is directly coupled to the corresponding VM from the storage apparatus 105, whereby a communication can be established. In other words, the VM and the LV communicate using the fabric service of the edge apparatus 101 that is directly coupled to the computer providing the VM. Therefore, when moving only the LV between the storage apparatuses without moving the VM between the computers, only the LV may log into or out from the fabric service.

The above has described the present embodiment. The present embodiment is as follows. In other words, the network 112 is formed by the edge apparatuses 101 and the switching apparatus 102. Each of the edge apparatuses 101 is provided with the fabric services 207. The VLAN 110 is allocated to each of the fabric services 207. The computer 104 accesses only the fabric services 207 that are configured in the edge apparatus 101 coupled to the network 112. The storage apparatus 105 accesses the fabric services 207 configured in all of the edge apparatuses 101. The management computer 106 allocates the logical volume 402 of the storage apparatus 105 to the virtual computer 304 of the computer 104, the communication interface 303 of the computer 104 to the VLAN 110, the communication interface 406 of the storage apparatus 105 to the VLAN 110, the virtual HBA 305 to the communication interface 303 of the computer 104, and the virtual HBA 407 to the communication interface 406 of the storage apparatus 105. In this manner, the communication path extending from the virtual computer 304 of the computer 104 to the logical volume 402 of the storage apparatus 105 can be managed.

In the path management above, without requiring a complicated configuration for linking the plurality of fabric services 207, the computer 104 can be coupled to all of the storage apparatuses 105 simply by accessing only one of the fabric services 207.

In addition, the edge apparatus 101 can change the VLAN allocation table 212 in response to the dynamic address change that is generated when the computer 104 and the storage apparatus 105 access the fabric services 207.

Even when migrating the virtual computer 304 between the computers 104 or migrating the logical volume 402 between the storage apparatuses 105, the communication path extending from the virtual computer 304 of the computer 104 to the logical volume 402 of the storage apparatus 105 can be configured. In addition, when migrating the virtual computer 304 between the computers 104 and migrating the logical volume 402 between the storage apparatuses 105, the edge apparatus 101 can temporarily change the VLAN allocation table 212 in response to copying the virtual computer 304 and copying the logical volume 402. In this manner, the communication paths for migrating the virtual computer 304 and the logical volume 402 can be configured temporarily.

Therefore, in the present embodiment, the communication paths can be configured easily, when expanding or removing the computers 104, storage apparatuses 105 or integrated apparatuses 109.

Moreover, when replacing the computers 104, storage apparatuses 105 or integrated apparatuses 109 with new apparatuses, the communication paths can be configured easily without changing the WWPN 801(b) configured for the virtual computer 304 and the WWPN 801(a) configured for the logical volume 402.

An embodiment of the present invention is described above. However, the present embodiment is merely an example illustrating the present invention and is not to limit the scope of the present invention. The present invention can be implemented in a variety of forms.

REFERENCE SIGNS LIST

101 Edge apparatus
102 Switching apparatus
104 Computer
105 Storage apparatus
106 Management computer
107 External network
112 Network
112 VLAN
109 Integrated apparatus

The invention claimed is:

1. An information system comprising:
a first computer;
a first storage apparatus;
a first network apparatus coupled to the first computer and the first storage apparatus and providing a first fabric service;
a second computer;
a second storage apparatus;
a second network apparatus coupled to the second computer and the second storage apparatus and providing a second fabric service; and
a network that couples the first network apparatus and the second network apparatus,
wherein:
the first computer is configured to access only the first fabric service that is provided by the first network apparatus to which the first computer is coupled;
the second computer is configured to access only the second fabric service that is provided by the second network apparatus to which the second computer is coupled;
the first storage apparatus is configured to access the first fabric service that is provided by the first network apparatus to which the first storage apparatus is coupled, and the second fabric service that is provided by the second network apparatus to which the first storage apparatus is coupled via the first network apparatus and the network;
the second storage apparatus is configured to access the second fabric service that is provided by the second network apparatus to which the second storage apparatus is coupled, and the first fabric service that is provided by the first network apparatus to which the second storage apparatus is coupled via the second network apparatus and the network;

the first fabric service provided by the first network apparatus is allocated to a first virtual network;
the second fabric service provided by the second network apparatus is allocated to a second virtual network; and
wherein the first fabric service and the second fabric service do not communicate with each other; and
wherein:
the first computer provides a first virtual computer;
the second computer provides a second virtual computer;
the first virtual computer is configured to access the first fabric service provided by the first network apparatus;
the second virtual computer is configured to access the second fabric service provided by the second network apparatus; and
wherein:
the first storage apparatus provides a first logical volume;
the second storage apparatus provides a second logical volume;
the first storage apparatus is configured to register the first logical volume into a function that is provided by a fabric service accessed by a virtual computer to which the first logical volume corresponds;
the second storage apparatus is configured to register the second logical volume into a function that is provided by a fabric service accessed by a virtual computer to which the second logical volume corresponds; and
wherein:
when the first virtual computer provided by the first computer is moved to the second computer,
the first virtual computer is configured to log out from a function provided by the first fabric service, and log into a function of the second fabric service that is provided by the second network apparatus coupled to the second computer to which the first virtual computer is moved; and
a storage apparatus that provides a logical volume related to the first virtual computer is configured to log the logical volume out from the function of the first fabric service, and log into the function of the second fabric service that is provided by the second network apparatus connected to the second computer to which the first virtual computer is moved.

2. An information system according to claim 1, wherein when the first virtual computer provided by the first computer is moved to the second computer, a third virtual network different from the first virtual network and the second virtual network is configured, and the first virtual computer is moved by using the third virtual network.

3. An information system according to claim 2, wherein:
when the first logical volume provided by the first storage apparatus is moved to the second storage apparatus,
the first storage apparatus, from which the first logical volume is migrated, is configured to log the first logical volume out from a function of a fabric service accessed by a virtual computer corresponding to the first logical volume; and
the second storage apparatus, to which the first logical volume is migrated, is configured to log the first logical volume into the function of the fabric service accessed by the virtual computer to which the first logical volume corresponds.

4. An information system according to claim 3, wherein when the first logical volume provided by the first storage apparatus is moved to the second storage apparatus, the virtual computer corresponding to the first logical volume does not log out from a function of a fabric service that is provided by a network apparatus connected to a computer providing the virtual computer.

5. An information system according to claim 4, wherein:
the first fabric service has a first fabric server function and a first name server function; and
the second fabric service has a second fabric server function and a second name server function.

6. An information system according to claim 1, wherein:
the first computer, the first storage apparatus, and the first network apparatus form a first integrated apparatus; and
the second computer, the second storage apparatus, and the second network apparatus form a second integrated apparatus.

7. An information system according to claim 6, wherein:
the first computer is configured to access only the first fabric service that is provided by the first network apparatus of the first integrated apparatus to which the first computer belongs;
the second computer is configured to access only the second fabric service that is provided by the second network apparatus of the second integrated apparatus to which the second computer belongs;
the first storage apparatus is configured to access the first fabric service that is provided by the first network apparatus of the first integrated apparatus to which the first storage apparatus belongs, and the second fabric service that is provided by the second network apparatus of the second integrated apparatus to which the first storage apparatus does not belong; and
the second storage apparatus is configured to access the second fabric service that is provided by the second network apparatus of the second integrated apparatus to which the second storage apparatus belongs, and the first fabric service that is provided by the first network apparatus of the first integrated apparatus to which the second storage apparatus does not belong.

8. A management method that is performed by a management computer connected to an information system that includes: a first computer; a first storage apparatus: a first network apparatus, to which the first computer and the first storage apparatus are connected, configured to provide a first fabric service; a second computer; a second storage apparatus; a second network apparatus, to which the second computer and the second storage apparatus are connected, configured to provide a second fabric service; and a network that connects the first network apparatus and the second network apparatus, the method comprising:
configuring, by the management computer, fabric service allocation information for associating the first fabric service with a first virtual network and associating the second fabric service with a second virtual network;
configuring, by the management computer, computer allocation information for associating the first virtual network with the first computer, and associating the second virtual network with the second computer;
configuring, by the management computer, storage apparatus allocation information for associating the first virtual network and the second virtual network with the first storage apparatus and associating the first virtual network and the second virtual network with the second storage apparatus; and
configuring, by the management computer, the first virtual network in the first network apparatus and the second virtual network in the second network apparatus such that the first computer accesses only the first fabric service that is provided by the first network apparatus to which the first computer is coupled, the second computer accesses only the second fabric service that is provided by the second network apparatus to which the second computer is coupled, the first storage apparatus accesses the first fabric service that is provided by the first network apparatus to which the first storage apparatus is coupled, as well as the second fabric service that is provided by the second network apparatus to which the first storage apparatus is coupled via the first network apparatus and the network, and that the second storage apparatus accesses the second fabric service that is provided by the second network apparatus to which the second storage apparatus is coupled, as well as the first fabric service that is provided by the first network apparatus to which the second storage apparatus is coupled via the second network apparatus and the network, wherein:

the first fabric service provided by the first network apparatus is allocated to a first virtual network;

the second fabric service provided by the second network apparatus is allocated to a second virtual network;

the first fabric service and the second fabric service do not communicate with each other;

the first computer provides a first virtual computer;

the second computer provides a second virtual computer;

the first virtual computer accesses the first fabric service provided by the first network apparatus;

the second virtual computer accesses the second fabric service provided by the second network apparatus;

the first storage apparatus provides a first logical volume;

the second storage apparatus provides a second logical volume;

the first storage apparatus registers the first logical volume into a function that is provided by a fabric service accessed by a virtual computer to which the first logical volume corresponds;

the second storage apparatus registers the second logical volume into a function that is provided by a fabric service accessed by a virtual computer to which the second logical volume corresponds; and when the first virtual computer provided by the first computer is moved to the second computer, the first virtual computer logs out from a function provided by the first fabric service, and logs into a function of the second fabric service that is provided by the second network apparatus coupled to the second computer to which the first virtual computer is moved; and a storage apparatus that provides a logical volume related to the first virtual computer logs the logical volume out from the function of the first fabric service, and logs into the function of the second fabric service that is provided by the second network apparatus connected to the second computer to which the first virtual computer is moved.

* * * * *